United States Patent
Meyers et al.

(12)

(10) Patent No.: US 11,728,902 B1
(45) Date of Patent: Aug. 15, 2023

(54) SYSTEM AND METHOD FOR COMMUNICATION OF INFORMATION USING INTERACTION FREE ENTANGLED PARTICLES AND ENTANGLED PHOTONS

(71) Applicant: U.S. Army DEVCOM, Army Research Laboratory, Adelphi, MD (US)

(72) Inventors: Ronald E. Meyers, Columbia, MD (US); Keith S. Deacon, Columbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 18/080,527

(22) Filed: Dec. 13, 2022

(51) Int. Cl.
*H04B 10/70* (2013.01)
*H04B 10/11* (2013.01)

(52) U.S. Cl.
CPC .............. *H04B 10/70* (2013.01); *H04B 10/11* (2013.01)

(58) Field of Classification Search
None
See application file for complete search history.

(56) References Cited

U.S. PATENT DOCUMENTS

| | | | |
|---|---|---|---|
| 6,822,739 B2 * | 11/2004 | Sergienko | G01N 21/211 356/369 |
| 9,270,385 B2 * | 2/2016 | Meyers | H04B 10/70 |
| 9,954,623 B2 * | 4/2018 | Dailey | H04B 10/70 |
| 10,992,391 B1 * | 4/2021 | Meyers | H04B 10/0799 |
| 11,169,427 B2 * | 11/2021 | Horn | G02F 1/3553 |
| 2018/0241480 A1 * | 8/2018 | Hughes | G06N 10/00 |

* cited by examiner

*Primary Examiner* — Jai M Lee
(74) *Attorney, Agent, or Firm* — Emily C. Moscati

(57) ABSTRACT

The manipulation and control of entangled particle and entangled photon properties by means of low loss interaction free quantum means is vital for studying the fundamentals of entanglement and for future applications in distributed quantum information processing, sensing and imaging. Despite its importance, achieving low loss interaction free manipulation and control of entanglement is difficult, particularly with pulsed networked systems with quantum properties changing in space and time and with intervening absorbing elements. This invention uses low loss quantum interaction free techniques and designs that can be miniaturized to efficiently and robustly send and receive quantum information and data using pulsed and continuous origin temporal and polarization entangled particles and entangled photons. The invention may be used to improve quantum communication of information and quantum networking in fiber optics, turbulent and scattering media, and free space.

23 Claims, 15 Drawing Sheets

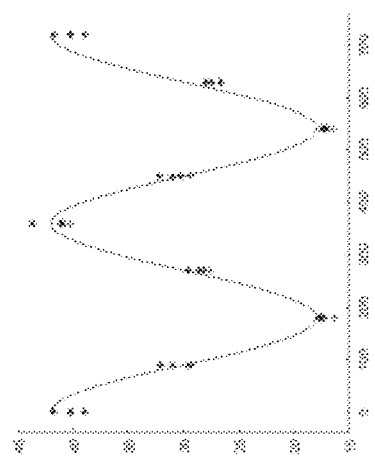
FIG. 2. Coincidences vs Interactive Phase Sum Settings
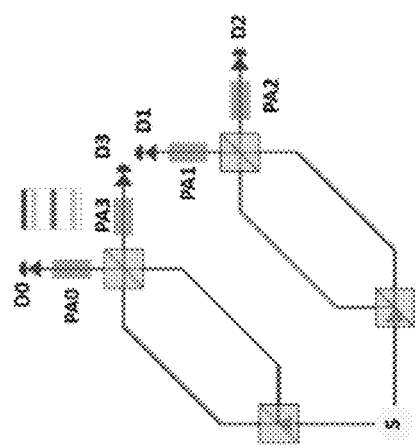
FIG. 1.

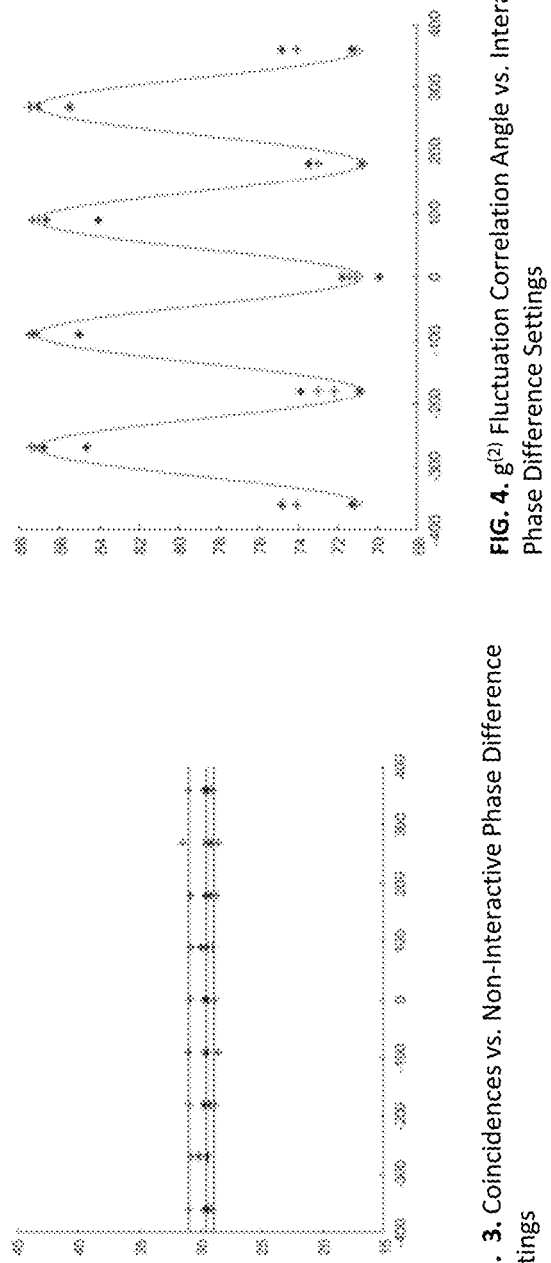
FIG. 3. Coincidences vs. Non-Interactive Phase Difference Settings
FIG. 4. $g^{(2)}$ Fluctuation Correlation Angle vs. Interactive Phase Difference Settings

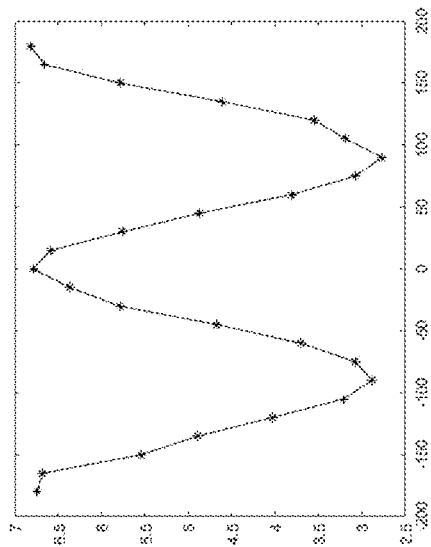
FIG. 6. $g^{(2)}$ vs. noninteractive half phase sum settings
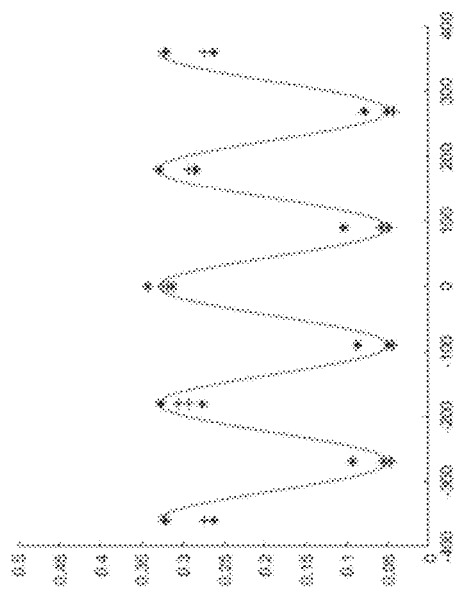
FIG. 5. $g^{(2)}$ Fluctuation Correlation vs. Interactive Phase Difference Settings

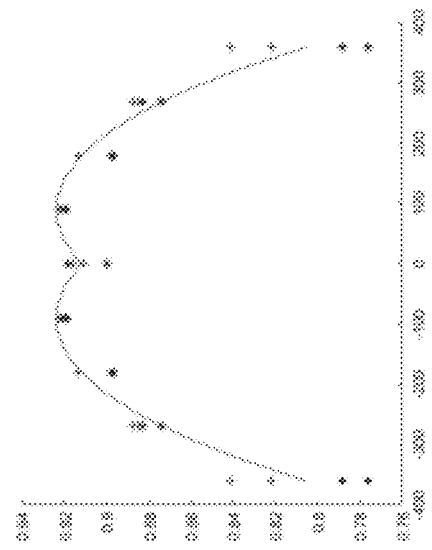
FIG. 8.
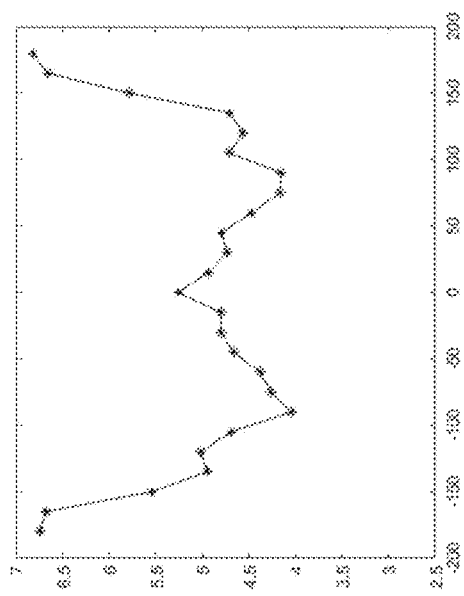
FIG. 7. $g^{(2)}$ vs. noninteractive half phase sum settings

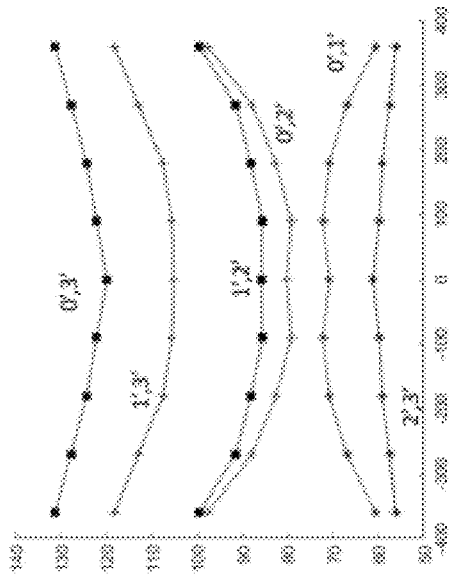
FIG. 10. Single Photon Fluctuation Correlation Angle vs. Noninteracting Phase Differences
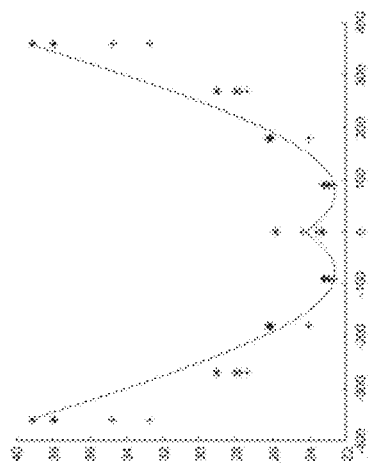
FIG. 9. $g^{(2)}$ Fluctuation Correlation Angle vs. Noninteracting Phase Difference Settings Example image of a 16 bit color image of George Washington in the US Continental Army in a battle communicated using entangled photons and the encoding method used by the inventive system. Left Image Sent by quantum means; Right: Image Received by quantum means

SYSTEM AND METHOD FOR COMMUNICATION OF INFORMATION USING INTERACTION FREE ENTANGLED PARTICLES AND ENTANGLED PHOTONS

GOVERNMENT INTEREST

The embodiments described herein may be manufactured, used, and/or licensed by or for the United States Government without the payment of royalties thereon.

TECHNICAL FIELD

The embodiments herein generally relate to the processing and/or transmission of data based upon quantum properties including quantum entanglement.

DESCRIPTION OF THE RELATED ART

Quantum properties include quantum entanglement and quantum teleportation of information, which is linked to the property of quantum entanglement. Quantum entanglement can exist between at least two quantum particles or quantum states or between a quantum particle and quantum state. Examples of entangled quantum particles include entanglement of at least two states between quantum particles such as photons, ions, and atoms. Entanglement also includes path entanglement. A quantum system is comprised of one or more quantum particles and/or states. A quantum system may exist in free space or in an apparatus or in both. An apparatus comprises one or more components that may generate, constrain, contain, and/or manipulate a quantum particle and or quantum state.

Quantum communications uses quantum systems to send information using qubits or higher dimensional qudits. Qubits are units of quantum information that may be visualized by a state vector in a two-level quantum-mechanical system. Unlike a binary classical bit, a qubit can have the values of zero or one, or a superposition of both. A qubit may be measured in basis states (or vectors) and a conventional Dirac symbol is used to represent the quantum state values of zero and one herein, as for example, |0> and |1>. For example, on a physical qubit this may be implemented by assigning the value "0" to a horizontal photon polarization and the value "1" to the vertical photon polarization. The "pure" qubit state is a linear superposition of those two states which can be represented as a combination of |0> and |1> or q=A|0>+B|1> or in generalized form $q_n = A_n|0> + B_n|1>$ where $A_n$ and $B_n$ represent the corresponding probability amplitudes, $A^2_n + B^2_n = 1$, and n is an index for a qubit. Unlike classical bits, a qubit can exhibit quantum properties such as quantum entanglement, which allows for higher correlation than possible in classical systems.

A pair of photons which are entangled can be referred to as an entangled photon pair. When one photon of an entangled photon pair is measured, the determination of the state of that photon (such as polarization or angular momentum) in effect determines the state of the other photon of the entangled photon pair, since entangled photon pairs are the conjugates of one another. In this example, each photon of the entangled pair may be considered a half of the entangled photon pair.

Prior art optical communications systems generally use watts of optical power in fiber systems to hundreds of milliwatts in free-space systems to communicate information. Entanglement optical communications can be achieved with significantly fewer photons than conventional optical communications by a factor of as much as 12 orders or more of magnitude, e.g., picowatts of optical power to transmit information.

Prior art optical quantum communications systems generally require the use of ancillary classical communications channel between a sender and receiver to transmit information. These classical communications systems are generally disrupted by scattering in the transmission path or atmospheric caused phase aberrations over free-space paths. Entangled photons and polarization entangled photons can be reasonably insensitive to atmospheric phase aberrations and scattering. Polarization entangled photons do not generally exhibit polarization during propagation until after interaction with a polarizer during a measurement process. Scattering in the propagation path of co-propagating entangled photons may introduce phase aberrations to individual photons but often the aberrations cancel or are not sensed in the measurement of the entangled photon phase sums or phase differences.

Measurement Synchronization

In order for a receiver to make accurate measurement of the information being transmitted by a sender with modulated entangled photons, the receiver must synchronize the timing of the receiver measurements with the times that the sender is transmitting entangled photons. One means to establish synchronized measurement of a pulsed source that operates at a known repetition rate involves scanning each detector over a range of delays spanning the time between two pulses. Each detector will measure a maximum of single photon counts when temporally synchronized with the rate the photons are being produced by the sender.

When the single photon counts are synchronized, then coincidence measurements between each pair of selected detectors are made with offsets for the coincidences being determined by +/− integer multiple offsets of the time between pulses. A peak of coincidence measurements will be found when, for example, detector A is at time $T(A_i)$ and detector B is at time $T(B_i)$ where i indicates the $i^{th}$ measurement in a sequence of single photon measurements. Further fine tuning of coincidences can be made by very slightly shifting T(A) or T(B) small time differentials, within the duration of a pulse, to find the maximum of coincidences. Herein a coincidence or coincidence count is defined as occurring when measuring a single photon count at T(A) and a single photon count at T(B) within some time interval.

In the case of continuous source of entangled photons, the measurements of the photon detections are shifted in time to find a maximum of coincidence detections. This may be accomplished, for example, by time-tagging all measured photons from all the detectors and the peak correlation can be found by post processing the time-tagged measurements to find the time-tag offsets for coincidence maxima. The relative time difference between the measured detection events for a coincidence measurement can be due to unequal propagation path distances, non-identical generation times of the entangled photons, and electronic processing buffering and lags when measured. Applying the synchronization methods described above helps to mitigate adverse effects.

Glauber Second Order Correlation

Other benefits of encoding information on entangled photon pairs include the ability of the receiver to authenticate the source encoded information and that the entanglement of entangled photon is largely insensitive to scattering and phase aberrations (see Meyers et al., ARL TR-7786, *"A Quantum Network with Atoms and Photons"*; P. Lodahl, A. Lagendijk, *"Transport of Quantum Noise through Random Media,"* Physical Review Letters 94 2005 (153905); Lodahl, et al., "*Observation of Spatial Quantum Correlations Induced by Multiple Scattering of Nonclassical Light*" Physical Review Letters 102 2009 (153905)) since the photons do not exhibit polarization until after measurement. The Glauber second order correlation $g^{(2)}$ can be determined by taking the ratio of the probability to measure a coincidence between detector a and detector b over some time interval dT represented by $<CC_{ab}>$ and dividing by the product of the probability of measuring a single photon on detector a or detector b, represented as $<D_a>$ and $<D_b>$ respectively. A $g^{(2)}$ value can then be computed as $<CC_{ab}>/[<D_a>*<D_b>]$. Note that $<>$ indicates an average over the ensemble of measurements. $g^{(2)}$ is typically a more stable measure than the raw measurement of the counting rates of coincidences and single photons. The present system and method can leverage the entanglement to authenticate the information being communicated. Generated entangled photons can be authenticated by examining the $g^{(2)}$ values of the measurements. Values of $g^{(2)}$ equal to 1 indicate a Poissonian source for the photons, such as a typical laser source. Values of $g^{(2)}$ greater than 2 indicate a super Poissonian source for the photons and is typical for entangled photon sources.

Generally, when the polarizers prior to detection transmit photons that are parallel to each other a maxima of coincidence events occurs when the entangled photons are in $\phi^{+/-}$ state and a minima of coincident events or corresponding Glauber second order correlation ($g^{(2)}$) values are registered when the entangled photons are in $\psi^{+/-}$ state. Due to this relationship between the Bell state being transmitted by the sender and the number of coincident events or corresponding $g^{(2)}$ values registered by the receiver over some time interval dT a message can be encoded by the sender into the transmitted Bell state and decoded by the receiver in terms of relative coincidence counts. Such encoding may take the form of a binary decomposition of the information, Morse code or the like which may include transmission of encrypted messages. However, due to non-deterministic entangled photon generation, losses along the propagation path and imperfect detectors, the use of an at least three stage encoding of a "1" or "0" value can improve robustness. This alternative means to distinguish the measurement of a transmitted bit value of "1" from "0" can be based on examining the $g^{(2)}$ or coincidence measurements at one sender modulator setting and the neighboring, i.e., in these measurements at different modulator settings both earlier and later. In this protocol the function BitVal=sign[F(t−1)+F(t+1)−2F(t)] where sign is a function that returns a 1 if the argument is greater than or equal to 0 and −1 if the argument is less than 0, F is the number of coincidence counts, $g^{(2)}$ values, or correlations at time t measured over an interval dT. Each "1" or "0" being transmitted can be represented in this manner by a High-Low-High triplet for "1" and a Low-High-Low triplet for "0". Furthermore, it is to be recognized that a Low-High-Low triplet may be defined as a "1" and the High-Low-High triplet as a "0".

In 1935, Einstein was the first to highlight quantum nonlocality effects and called for experiments to verify its non-local "spooky action at a distance" now known as EPR effects (see A. Einstein, et al., "*Can Quantum Mechanical Description of Physical Reality be Considered Complete?*", Physical Review 47, 777 (1935)). The first experimental confirmation of the EPR effects occurred in 1982 (see A. Aspect, et al., "*Experimental of Bell's Inequality using time-varying analyzers*", Physical Review Letters 49, 91, (1982)). The EPR effect is readily apparent in entangled photon experiments with spontaneous parametric down conversion (SPDC) (see T. B. Pittman, et al., "*Optical imaging by means of two photon quantum entanglement*", Physical Review A 52, R3429 (1995)) and four wave mixing (FWM) source generation (see R. Meyers, et al., "*Fiber entangled photon pair source connecting telecom to quantum memories*," Journal of Physics Communications (2017)). EPR research since Einstein's revelation at first focused on the quest for fundamental knowledge (see T. B. Pittman, et al., "*Optical imaging by means of two-photon quantum entanglement*", Physical Review A 52, R3429 (1995)), but quickly evolved into technology development as exemplified by remote quantum imaging and sensing (see R. Meyers, et al. "*Ghost-imaging experiment by measuring reflected photons*," Physical Review A 77 041801(R) (2008)), imaging through turbulence (see R. Meyers, et al., "*Turbulence free ghost imaging*," Applied Physics Letters 98, 111115 (2011), J. G. Rarity, P. R. Tapster, "*Fourth order interference effects at large distances*," Physical Review A 45, 3 (1992), P. Hariharhan, B. C. Sanders, "*Four photon inteferomometry for secure quantum key distribution*," Optics Express 10, 21, (2002)), and is evolving toward distributed quantum information processing and sensing in quantum networks.

A fundamental building block of distributed quantum information process is the Mach Zehnder interferometer (MZI) with multiple inputs for entangled photons, beam splitters for interference, polarization analyzers for control, and multiple outputs and detectors for distributing and measuring the information. Mach Zehnder interferometers have been used in quantum experiments for many purposes because of their interference properties exploiting the properties of particle entanglement, path entanglement, superposition, and nonlocality (see B. P. Williams, et al., "*Nonlocal polarization interferometer for entanglement detection*", Physical Review A, 90 (2014), P. Hariharhan, B. C. Sanders, "*Four-photon inteferomometry for secure quantum key distribution*," Optics Express 10, 21, (2002), J. D. Franson, "*Bell inequality for position and time*," Physical Review Letters 62, 2205, (1989), and J. G. Rarity, P. R. Tapster, "*Fourth order interference effects at large distances*," Physical Review A 45, 3 (1992)). Theoretical and experimental research (see A. C. Elitzur, L. Vaidman, "*Quantum mechanical interaction free measurements*," Foundations of Physics, 23, 987, (1993)) led to the discovery that photon channels can be modulated interaction free by introducing absorbing elements into the interior of a Mach Zehnder interferometer (also referred to as "MZI") and counting the photons exiting ports from transmitting versus reflecting paths (see P. G. Kwiat, et al., "*High efficiency quantum interrogation measurements via the quantum zeno effect*," Physical Review Letters, 83, 4785 (1999), and A. G. White, et al., "*Interaction free imaging*," Physical Review A V58, n1, (1998). Pioneering work in asymmetric MZI paths has led to fundamental discoveries (see J. D. Franson, "*Bell inequality for position and time*," Physical Review Letters 62, 2205, (1989), and development of long distance communication systems (see J. G. Rarity, P. R. Tapster, "*Fourth order interference effects at large distances*," Physical Review A 45, 3 (1992)). However, asymmetric paths and/or the entry of elements into the MZI interior while providing probing of internal objects destroys the path symmetry and possibly voids or negates discovery of some of the symmetric properties of the quantum system.

Interaction free modulation or equivalently noninteracting entangled photon modulation exclusively from the exterior of the network has not been sufficiently explored prior to this invention. Non-interactively modulated polarization entangled photons are useful for quantum communications, quantum imaging, quantum sensing and quantum information processing. It is important to develop new capabilities for polarization entangled photons to be modulated by noninteractive means after transiting the interferometer, and remotely measured for quantum communications. Then noninteractive settings could modulate noninteracting photons and biphotons from the exterior of the MZI. This new modulation capability has profound implications for quantum information processing, quantum sensing, and quantum information processing. The entangled photons in the MZI reliably sense exterior elements interaction free thereby allowing new engineering modalities and miniaturization of the interior parts. Interaction free also means that the modulated elements do not absorb photons in the sender's path. Interaction free entanglement network information control includes information modulation, and distribution. To achieve all these benefits our research was directed to experimentally demonstrate, model and verify in a small MZI quantum network a reliable external interaction free means to modulate polarization entangled biphotons suitable for applications in quantum communications, quantum sensing, and distributed quantum information processing.

Entangled photon pairs, known as biphotons, carry nonlocal mutual information of a quantum system and are useful for such diverse fields as quantum communications, quantum sensing, quantum imaging, quantum metrology and quantum information processing. Previous experiments demonstrated that photon channels can be modulated interaction free by introducing absorbing elements into the interior paths of a Mach-Zehnder Interferometer (MZI) and counting the photons exiting ports from transmitting versus reflecting paths. Unfortunately, the absorbing elements are lossy and remove photons from the system and lower efficiency. It is important to develop a new lossless capability where polarization entangled photons can be modulated by noninteractive means after transiting the interferometer that can be remotely measured for quantum applications. If the noninteractive settings could modulate noninteracting photons and biphotons from the exterior of the MZI, it would enable a new means of modulation that has profound implications for quantum communications, quantum sensing, and quantum information processing. Essentially the entangled photons in the MZI reliably sense exterior elements interaction free and permit the development of new engineering modalities for quantum control and miniaturization of distributed quantum information processing and other quantum technology.

SUMMARY

The present invention is directed to a system and method for the communication of information using interaction free entangled photons. A preferred embodiment of the present invention includes a communication system comprising sender and receiver subsystems, and at least one pulsed entangled photon source configured to output a sequence of entangled photons to the sender and receiver subsystems. The sender subsystem comprises at least one data input configured to receive inputted data, and a clock, processor, and polarization analyzers to encode the inputted data onto pairs of measured single photons and a measured entangled photon state. The receiver subsystem comprises a clock, processor, polarization analyzers, and optionally gated detectors to measure the encoded state transmitted by the sender.

The photons produced by an entangled photon system are in a known state of entanglement, for example, a $\phi^+$ Bell State=|HH>+|VV> polarization entangled state. Each photon of a polarization entangled photon pair is un-polarized but the relationship between the entangled photons is such that, in the case of a $\phi^+$ Bell State, were one of the photons to be measured as |H> the other photon of the pair must also be measured as |H> to produce a coincident detection. It must be noted that to measure a coincidence maxima from a $\phi$ state polarizers before each detector must be in a parallel orientation to each other, whereas to measure a coincidence maxima from a state, orientations of the polarizers must be orthogonal to each other.

Prior art systems generally work over either free-channels or fiber optic channels. One advantage of the present invention is that the system and method can communicate over fiber optic channels, free-space channels or a mixture of free-space and fiber optic channels. Prior art optical communications systems typically rely on external clocks or very bright optical pulses at ancillary wavelengths to provide timing information on when information is being communicated. In the present system and method, the entanglement of the photon pairs can be used to adjust or correct timing after or during information communication to optimize the information transfer.

Prior art optical communications and quantum optical communications systems typically rely on the sender components of information modulating photons and the modulated photons are then measured by the receiver components. In the current invention, the photons that the sender components modulate are not subsequently measured by the receiver components. The photons measured by the receiver are termed non-interactively modulated or interaction free modulated photons. Herein sender components are referred to as the sender and receiver components are referred to as the receiver.

Prior art optical communications generally rely on information being transmitted on specific wavelengths or wavelength bands such as the International Telecommunications Union (ITU) grid specifications for coarse wavelength division multiplexing (CWDM) and dense wavelength division multiplexing (DWDM). In these prior art optical communications, transmission of information occurs on each channel individually. The present system and method can operate using a wide range of photon wavelengths allowing the invention to be optimized for operational transmission conditions and further allowing encoding of information between multiple wavelength pairs to increase the information transmission rate.

This invention demonstrates quantum mechanically modeled and verified interaction free modulation of entangle pairs of photons and their single photons in our double MZI setup as a function of the noninteracting phase settings, entanglement, time-frequency bandwidth, and uncertainty. This invention has significant implications for progress in quantum communications, quantum sensing/imaging and quantum information processing.

BRIEF DESCRIPTION OF THE DRAWINGS

The embodiments herein will be better understood from the following detailed description with reference to the drawings, in which:

FIG. 1 is a conceptual diagram illustration of the invention using pulsed polarization entangled photons injected into two balanced Mach Zehnder interferometers. Measurements and phase control are on the exterior of the interferometers.

FIG. 2 presents measurements using the invention of Coincidences vs Interactive Phase Sum Settings.

FIG. 3 presents measurements using the invention of Coincidences vs. Non-Interactive Phase Difference Settings.

FIG. 4 presents measurements using the invention of $g^{(2)}$ Fluctuation Correlation Angle vs. Interactive Phase Difference Settings.

FIG. 5 presents measurements using the invention of $g^{(2)}$ Fluctuation Correlation vs. Interactive Phase Difference Settings.

FIG. 6 presents measurements using the invention of $g^{(2)}$ vs. noninteractive half phase sum settings.

FIG. 7 presents measurements using the invention of $g^{(2)}$ vs. noninteractive half phase sum settings.

FIG. 8 presents results of the inventive system computing correlations of the receiver $g'^{(2)}$ as a function of the difference of the sender polarization analyzer settings illustrating the basis for the non-interaction information transmission system. The symbols are the measured correlations and the solid line is predictive model fit to the measured results.

FIG. 9 presents measurements using the invention of $g^{(2)}$ Fluctuation Correlation Angle vs. Noninteracting Phase Difference Settings.

FIG. 10 presents results of the inventive system computing correlations of the receiver $\langle I_a' I_b' \rangle$ in angle units as a function of the difference of the sender polarization analyzer settings illustrating the basis for the non-interaction information transmission system. The symbols are the measured correlations and the solid lines are predictive model fits to the measured results.

DETAILED DESCRIPTION OF THE INVENTION

Figure 11:
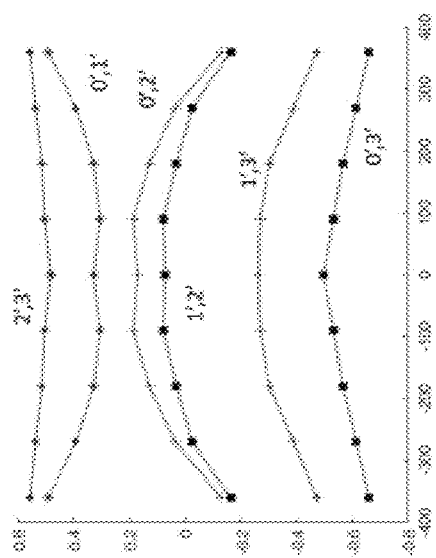
FIG. 11 presents results of the inventive system computing correlations of the receiver $\langle I_a' I_b' \rangle$ as a function of the difference of the sender polarization analyzer settings illustrating the basis for the non-interaction information transmission system. The symbols are the measured correlations and the solid lines are predictive model fits to the measured results.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skilled in the art to practice the embodiments of the invention. Various changes may be made without departing from the spirit and scope of this description and the claims. Accordingly, the examples should not be construed as limiting the scope of the embodiments of the invention. The claims define the invention.

Relative sizes of components are for illustrative purposes only and do not reflect the actual sizes that may occur in any actual embodiment of the invention. Like numbers in two or more figures represent the same or similar elements. Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

The terminology used herein is for the purpose of describing particular embodiments only and is not intended to limit the full scope of the invention. As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second entangled photon regions, these terms are only used to distinguish one entangled photon source, region, element, component, layer or section from another source, region, element, component, layer or section. Thus, a first source, region, element, component, layer or section discussed below could be termed a second source, region, element, component, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Accordingly, the present invention utilizes entangled photons and their properties as carriers of information that is encoded in the relationship between the pairs of entangled photons. Experiments were performed in a dual MZI setup where each photon of an entangled pair was injected into the analogous port of the separate MZI as shown in FIG. 1. The entangled photons were generated from a pulsed narrow-band four wave mixing source in the telecom band. For purposes of symmetry, efficiency and to reduce errors, the MZIs were combined through use of fiber beam splitter couplers and wavelength division multiplexers (WDM) into a single system with two shared beam splitters.

Algorithm Using Correlations

Polarization analyzers (PA) are used in the system. One means to transfer information from a sender to a receiver using the current invention involves determining the correlation of the receiver coincidence counts (CCr) as a function of the sender polarization analyzer (SPA) settings. The sender and receiver comprise two PA each. The process involves a pre-sharing of the order in which the SPA orientations are set. For example, the sender pre-shared settings for the order and values of the sender PA setting could be for $(SPA_a)_n$, $(SPA_b)_n = (0_a)_1, (0_b)_1, (90_a)_2, (0_b)_2, (180_a)_3, (0_a)_3, (270_a)_4, (0_b)_4, (360_a)_5, (0_b)_5, (0_a)_6, (90_b)_6 \ldots (360_a)_n, (360_b)_n$. Here a and b indicate the specified SPA and n indicates the $n^{th}$ setting in a sequence of settings. For each of the sender SPA settings the receiver would measure CCr for a set of specified receiver PA settings (RPA), e.g., 0, 90, 180, 270, 360 settings for both RPA. The receiver can compute a correlation of the CCr and from the pre-shared information of the sender settings arranges the correlations into an order determined by, for example, the difference of the $SPA_{a,b}$ setting values. This type of process would be used in a calibration of the system.

The correlation values are determined by the receiver as follows: Corr=

$$\frac{\langle C_{ab'} C_{a'b} \rangle_{a,b}}{(\sigma_{ab'})(\sigma_{a'b})}$$

where $C_{ab'} = C_{ab} - \langle C_{ab} \rangle_b$ where $\langle \ \rangle_b$ indicates an average over the coincidence count (CC) measurements recorded for the $RPA_b$ settings and $C_{a'b} = C_{ab} - \langle C_{ab} \rangle_a$ where $\langle \ \rangle_a$ indicates an average over the CC measurements recorded for the $RPA_a$ settings;

$$\sigma_{ab'} = \sqrt{\langle (C_{ab'})^2 \rangle_b}$$

where $\langle \ \rangle_b$ indicates an average over the $RPA_b$ settings and $$\sigma_{a'b} = \sqrt{\langle (C_{a'b})^2 \rangle_a}$$

where $\langle \ \rangle_a$ indicates an average over the $RPA_a$ settings. Note that the prime indicates the deviation or fluctuation of the measured value with respect to the mean or average. The correlations are computed at specified $SPA_a$ and $SPA_b$ pair settings. The mathematical notation used here is helpful in the computation of the correlations.

The receiver measured correlations as a function of the difference of the SPA values has minima at +/−360 and local maxima at +/−90. This difference in the receiver measured correlations allows for the sender to encode information into the difference settings of the SPA to cause the receiver to measure a maximal value, e.g., a bit value 1, or a minimal value (bit value 0). Similarly, the High-Low-High, Low-High-Low procedure can be used to increase the likelihood of a valid bit-transmission.

To send a bit value of "1" using the triplet process the sender would set the SPA to values wherein the difference is +/−90 for the High measurement; the receiver would make the measurements to determine the CCr correlation and store that value; The sender would then set the SPA values such that the difference is +/−360 and the receiver would make the measurements to determine the CCr correlation and store that value; for the last High measurement, the sender would set the SPA to values wherein the difference is +/−90 and the receiver would perform measurements to determine the CCr correlation and store that value. The receiver would measure a High-Low-High correlation sequence and determine that the sender sent a bit value of "1". Similarly, when the receiver measures a Low-High-Low sequence the receiver determines that the sender sent a bit value of "0". It is recognized that other two-particle measurements such as $g^{(2)}$ may be used in place of the coincidence measurements.

Correlations from Products of the Deviation of Single Photon Counts

Similar to the correlation of the deviations, or fluctuations, of the measured coincidence counts above the correlation of the product of the deviations of the measured single photon counts may be used to transfer information. When using measured single photon counts the correlation values are determined by the receiver as follows:

$$Corr_s = \frac{\langle I'_a I'_b \rangle_{a,b}}{(\sigma_a)(\sigma_b)}$$

where $I_a' = I_a - \langle I_a \rangle_{a,b}$ where $\langle \ \rangle_{a,b}$ indicates an average over the $RPA_a$ and $RPA_b$ settings and $I_b' = I_b - \langle I_b \rangle_{a,b}$ where $\langle \ \rangle_{a,b}$ indicates an average over the measurements recorded with the $RPA_a$ and $RPA_b$ settings respectively;

$$\sigma_a = \sqrt{\langle (I_a')^2 \rangle_{a,b}}$$

where $\langle \ \rangle_{a,b}$ indicates an average over the $RPA_a$ and $RPA_b$ settings and $$\sigma_b = \sqrt{\langle (I_b')^2 \rangle_{a,b}}$$

where $\langle \ \rangle_{a,b}$ indicates an average over the $RPA_a$ and $RPA_b$ settings. The correlations are computed at specified $SPA_a$ and $SPA_b$ pair settings. The mathematical notation used here is helpful in the computation of the correlations.

Two polarization analyzers (PAs) and two single photon detectors were affixed to each of the two ports, with labeling D0, D1 at one port face and D2 and D3 at the other port face. Each PA contained four elements in sequence, from in to out a half-wave plate (HWP), a quarter-wave plate (QWP), a half-wave plate (HWP), and polarizer (POL). Photon detections were time stamped and coincidence counts, single counts and $g^{(2)}$ Glauber second order coherences were evaluated (see RJ Glauber, "*The Quantum Theory of Optical Coherence*", Physical Review 130, 2529 (1963)). The polarizers were fixed but the linear phase modulators rotated to implement modulations. Prior to the experiment the setup was extensively calibrated to eliminate spurious polarization and to ensure Bell states were achieved via two photon interference, and to optimize timing.

Photons exiting the ports produced coincidences that could be modulated by the interacting PAs through which the photons exited, or by the noninteracting PAs that were not at the measured coincidence or photon exit ports. Each experiment was performed for an array of settings such that photon counts, coincidence counts, and $g^{(2)}$ values could be compared with the interacting and noninteracting PA settings. Representative PA settings include setting values for each detector PA to 0, 90, 270 and 360 degrees in the phase basis for each value of the other detector PAs, so sequences of 5×5×5×5 measurements were performed to cover the parameter space. Higher resolution experiments were performed where two of the PAs were set to values of 0 to 360 in steps of 30 degrees for higher resolution sequences of 5×5×13×13 measurements. Each experiment was repeated to verify consistency.

Methods were developed to extract data conditioned on interacting and noninteracting PA settings. The interacting settings were readily measured by polarization measurements, however extraction of information reliably from noninteracting PA settings required development of new coincidence, $g^{(2)}$, and single photon polarization based correlation methods consistent with quantum information processing. Significantly, mathematical models were developed and tested against the $g^{(2)}$, coincidence and single photon measurements as a function of the interacting and noninteracting settings.

When the entangled photon source creates an entangled pair, then each photon of the pair is injected into one of the two MZI. For this four wave mixing process (FWM) one signal photon of a pair is injected into one MZI and the idler photon in injected into the other. Each photon of a generated biphoton is polarization entangled with the other half of the pair and in a superposition of polarization states. The beam splitters create reflections and transmission of single photons on a random basis. Each detector can be reached by one photon by way of two paths and the phase of the biphoton system is modulated by the phase plate settings of the polarization analyzers. Normally in a simple two photon interference setup only the modulators in the paths of the photons affect the measurements. In this two MZI system, the phase modulators in all the possible paths of the MZIs affect the outcomes even if the photons measured do not directly interact with the modulators. This is a manifestation of quantum mechanics and path entanglement.

The photon measurements are gated at a rate of approximately $\Omega = 1.25$ GHz. The coincidence window for each detector is $T/2 = 25$ picoseconds giving an overall time frequency bandwidth of approximately $\Omega T = \pi/8$ for coincidence measurements involving both coincidence windows. Photons measured within the same coincidence window are termed coincident. This is also the interval of indeterminacy of which of the measured entangled photons is measured first, permitting interference measurements of the entanglement generated Bell state properties generated in the nonlinear Sagnac nonlinear fiber. Detector D0 is reached by a TR, or a RT path, where R is reflection and T is transmit regarding interaction with the two beam splitters. Similarly, detector D3 is reached by a TT or a RR path. For detector D1 the paths are TT or RR and detector D2 has TR and RT paths. Because there are multiple paths for the entangled photons the system will exhibit path entanglement. Different from other systems which exhibit pathological beating from multiphoton interference, in our system there is a very low probability of multiple photons in any path or junction so multiphoton caused beating is avoided. The reflections induce a $\pi$ phase shift on a reflected photon.

This invention demonstrates reliably interaction free modulated entangled photon coincidences and $g^{(2)}$ in a pulsed FWM entangled photon system. With our quantum based polarization fluctuation correlation extraction method based on our measured and deduced wavefunctions, we were able to measure and model the results in terms of a geometric phase that depends on entangled photon paths, coincidence window, gating repetition rate, and the PA noninteracting half sum and half difference analyzer settings. We found that the analysis of the measurement process was repeatable with small variation. The approach recovers the polarization coincidence and $g^{(2)}$ fluctuation correlation measures that quantify the accuracy and uncertainty as a function of the PA settings which can quantify the effects that turbulence, scattering and other noise on the system. In addition, our Fano and Noise Reduction Factor (NRF) (see I. Rao-Bechara, et al., "*One and two mode squeezed light in correlated interferometry*," Physical Review A 92 (2015)) measurements showed consistent results and the CHSH (see B. P. Williams, et al., "*Nonlocal polarization interferometer for entanglement detection*," Physical Review A, 90 (2014)) experiments on our system showed high entanglement and nonlocality. An extraction of the polarization fluctuation correlations with single photons as a function of noninteracting settings was also successful but with larger error due to an increased timing uncertainty, though with related behavior to the coincidence measurements. Importantly, single photons modulation for remote communications worked even in the cases when signals (idlers) were modulated and idlers (signals) single channels communicated remotely.

Measurements of the interactive phase sum two photon coincidences and $g^{(2)}$ were made and the $g^{(2)}$ measurements are displayed in FIG. 2. The patterns from the pulsed and gated FWM system display solutions with similar periodicities to those found in the literature (see T. B. Pittman, et al., "Can two photon interference be considered the inference of two photons?," Physical Review Letters 77, n10, (1996)) for sum and differences phases. These can be compared with the different interaction free periodicities shown in the next sections. The vertical variations in the figures are for the measurements from different detector pair channels.

For this particular dataset the $g^{(2)}$ and coincidences magnitudes as a function of the noninteractive elements had small oscillations which are not resolvable in FIG. 3 on the displayed scale. However, this invention modulates the fluctuation correlations using noninteracting control even where $g^{(2)}$ and coincidences have low visibility. Through the use of noninteractive modulations, the $g^{(2)}$ and coincidences magnitude modulations are modeled with a $2\pi$ phase period with good visibility. Higher visibility $g^{(2)}$ and coincidences were achieved by increasing the data set number of noninteractive settings to 13 and increasing the phase interval resolution.

Compared to the $g^{(2)}$ magnitudes, the $g^{(2)}$ fluctuation correlations and correlation angles as a function of interactive settings exhibited a higher frequency and had a factor of two shorter period of oscillation with phase shown in FIG. 4.

The interactive coincidence fluctuation correlation coefficient period is half of that for coincidences as shown in FIG. 5 and has a similar period dependence that was exhibited in a SPDC system. This is analogous to the results found in the variance of coincidences at half the period of the mean for high efficiency measuring systems (see A. Kuzmich, L. Mandel, "Sub-shot-noise interferometric measurements with two photon states," Quantum Semiclassical Optics B (1998)).

The $g^{(2)}$ magnitudes are depicted as a function of noninteractive half phase sum and half phase difference settings in FIG. 6 and FIG. 7 respectively. The noninteractive half phase sum $g^{(2)}$ exhibits a cosine squared probability dependence on top of the background while the noninteractive half phase difference exhibits a damping of the cosine squared oscillation in the center portion of an oscillation. When the center is damped, it tends to give the appearance of a longer period of oscillation.

Calculations of Coincidence Fluctuations

In the following we describe the calculation of the $g^{(2)}$ fluctuation covariance and fluctuation correlation coefficients where indices indicate the phase settings of the interactive and noninteractive ports. Here, ab indicates the interactive ports and cd indicates the noninteractive ports. Here we show the $g^{(2)}$ phase modulated fluctuation covariances averaged over the interactive port settings as a function of the noninteractive port settings. The settings for each abcd port are the setting indices ijkl respectively.

The subscripts on the averaging brackets indicates the terms averaged over. The Glauber second order coherence is given by $$g^{(2)a,b}_{ijkl} = \frac{c^{a,b}_{ijkl}}{I^a_{ijkl} I^b_{ijkl}} \quad (1)$$

where the superscript is suppressed in the following expressions for the fluctuation correlations $$\langle g'_{i,jkl} g'_{j,ikl} \rangle_{ij} = \langle (g_{ijkl} - \langle g_{ijkl} \rangle_i)(g_{ijkl} - \langle g_{ijkl} \rangle_j) \rangle_{ij} \quad (2)$$

where the superscript indicates a fluctuation (deviation from the mean). The commas in the subscripts separate indexes on the left of the equals sign that have been averaged over from the indexes on the left of the equals sign that have not been averaged over. To find the correlation coefficient, we divide by the product of the standard deviations $$\frac{\langle g'_{ijkl} g'_{j,ikl} \rangle_{ij}}{\sigma_i \sigma_j} = \frac{\langle (g_{ijkl} - \langle g_{ijkl} \rangle_i)(g_{ijkl} - \langle g_{ijkl} \rangle_j) \rangle_{ij}}{\sigma_i \sigma_j}. \quad (3)$$

The standard deviations can be calculated as follows $$\sigma_i^2 = \langle g'_{i,jkl} g'_{i,jkl} \rangle_{ij}. \quad (4)$$

As an example, $\sigma_i$ means the standard deviation averaged over the port a and port b settings i, j respectively, conditioned on k, l. The correlations are distributed over phase sums or phase differences for each trial. The mathematical notation used here is helpful in the description of the physics of both interacting and non-interacting photons and optical elements. Analogous to $g^{(2)}$ we can calculate correlated single photon and coincidence fluctuations. The correlations can be identified with cosines since correlations are inner products which produce cosines. Since two photon interference results in a cosine interference for entangled photons, it is reasonable to exploit the correlation for insight into quantum mechanical system behavior.

Coincidence Correlation Coefficients and Angles

The $g^{(2)}$ fluctuation correlation coefficients and angles are modeled as a function of noninteractive phase difference which are shown below. Data from six experiments are plotted over the model. The separate symbols represent four different coincidence pair measurements between a signal mode and an idler mode, D0D1, D2D3, D1D3, and D0D2. The $g^{(2)}$ fluctuation correlation was measured and modeled as seen in FIG. 8. The noninteractive data has longer periodicity than the coincidence and fluctuation correlations of the interactive systems. The period of oscillation of the phase sum or phase difference is $4\pi$.

The noninteractive fluctuation correlation angles are depicted in FIG. 4. Similar to the correlation coefficients, the correlation coefficient angles have a period of $4\pi$ with respect to the phase sum or phase difference. It is interesting that the measured minimum angle is $\pi/8$ which is equal to the combined time frequency bandwidth product of the entanglement system for the settings used. The cusp in FIG. 9 may be a signature of time frequency bandwidth phase shift in the geometric phase of the system. In FIG. 9 the $g^{(2)}$ fluctuation correlation angle is a geometric phase. However, phase sum or phase difference modulation can help find the minimum uncertainty point in the system.

Non Interacting Single Photon Correlation Coefficient

The noninteractive single photon correlation coefficient can be calculated as follows $$\langle I'_{i,jkl} I'_{j,ikl}\rangle_{ij} = \langle (I_{ijkl} - \langle I_{ijkl}\rangle_i)(I_{ijkl} - \langle I_{ijkl}\rangle_j)\rangle_{ij} \quad (5)$$

and $$\frac{\langle I'_{i,jkl} I'_{j,ikl}\rangle_{ij}}{\sigma_i \sigma_j} = \frac{\langle (I_{ijkl} - \langle I_{ijkl}\rangle_i)(I_{ijkl} - \langle I_{ijkl}\rangle_j)\rangle_{ij}}{\sigma_i \sigma_j}. \quad (6)$$

The mathematical notation used here is helpful in the description of the physics of both interactive and noninteractive photons and optical elements. The single photon noninteractive correlation coefficient was experimentally measured for all six detector pair combinations and is depicted in FIG. 10 where the numbered pair combinations were plotted as a function of the noninteractive phase settings difference.

The coincidence fluctuation correlations were measured as depicted in FIG. 11. They exhibit the 4π period and show negative correlation in some data.

Note that these measurements indicate that two ports are correlated and in the single photon case can even be manipulated by the noninteractive phase settings for any port combinations. They appear to be suitable for a version of single photon quantum communication of information.

Model for Interaction Free Modulation of Entangled Photons

The measurements of the $g^{(2)}$ noninteractive fluctuation correlations, ρ, were consistent and repeatable with relatively small error. From these consistent sets of data, we were able to deduce a model that faithfully represents the key aspects of the measurements. For ρ we obtained $$\rho = \cos\left(\frac{\pi}{4} + \left(\frac{\pi}{8}\right)\cos\left(\left(-\frac{\pi}{8}\right) + \pi + \frac{|\delta\phi|}{2}\right)\right) = \cos\theta \quad (7)$$

The measured and modeled angle θ fits the form of a geometric phase, the concepts of which were pioneered with insightful theoretical and experimental quantum research (see A Pancharatnam, "*Generalized Theory of interference and its application*," Proceedings Indian Academy of Sciences, 44 247 (1956)), M. V. Berry, "*Quantal phase changes accompanying adiabatic phase changes*," Proceedings of the Royal Society London, A 392, 45 (1984)], and Y. Aharonov, J. Anandan, "*Phase change during a cyclic quantum evolution*," Physical Review Letters 58, 1593, (1987)). Geometric phase depends on the path of the quantum system and applies to bosonic as well as fermionic systems.

$$\theta = \frac{\pi}{8} + \left[\frac{\pi}{8} - \left(\frac{\pi}{8}\cos\left(-\frac{\pi}{8} + \frac{|\delta\phi|}{2}\right)\right)\right] \quad (8)$$

The π/8 terms because of the similarity in values suggest exploring ΩT, the time frequency bandwidth product, in a quantum system model of our setup. Thus, we can cast the equations above as a correlation.

$$\rho = \cos\left(\left(2\Omega T + (\Omega T)\cos\left((-\Omega T) + \pi + \frac{|\delta\phi|}{2}\right)\right)\right) = \cos\theta \quad (9)$$

$$\theta = \Omega T(1 + 2P) \quad (10)$$

where $$P = \frac{1}{2}\left(1 - \cos\left(-\Omega T + \frac{|\delta\phi|}{2}\right)\right). \quad (11)$$

We can define the time frequency bandwidth as $$\Delta = \Omega T \quad (12)$$

Then we can find that the minimum θ is Δ at $$|\delta\phi| = \frac{\pi}{4}. \quad (13)$$

The effective wavefunction containing the correlation p can be modeled as a superposition $$\psi = \frac{1}{2}\left(e^{\frac{i\theta_1}{2}} + e^{\frac{i\theta_2}{2}}\right) \quad (14)$$

which yields for the wavefunction correlation $$\psi\psi^* = \frac{1}{2}[1 + (\cos(\theta_1 - \theta_2))] = \frac{1}{2}[1 + \cos\theta]. \quad (15)$$

We equate ρ with the cosine correlation $$\rho = \cos\theta \quad (16)$$

where the cosine term is a result of quantum interference but p results from extracting it from measurements. When the correlation is found then the cosine can be inverted to find the angle θ which we do in analyzing our geometric angle data sets.

Half Sum Phase and Half Difference Phase Geometric Phase

For the $g^{(2)}$ fluctuation correlation experiments as a function of the noninteractive phases we modeled the phase we extracted as the cosine form of a geometric phase. It has the expected one minus cosine form and when the argument of the cosine reduces to zero the minimum phase represents the minimum uncertainty in angular phase units of the entangled biphoton system. When the half difference phase was evaluated then we obtained a geometric phase fit by the equation $$\theta = \frac{\pi}{8} + \left[\frac{\pi}{8} - \left(\frac{\pi}{8}\cos\left(-\frac{\pi}{8} + \frac{|\delta\phi|}{2}\right)\right)\right]. \quad (17)$$

For the geometric phase θ in modeled form we identify the pi/8 as the time frequency bandwidth. This gives the dependence as $$\theta = \Omega T + \Omega T\left[1 - \cos\left(-\Omega T + \frac{\phi_1 - \phi_2}{2}\right)\right] \quad (18)$$

An alternate form which is a function of both half sum phases and half difference phases can be constructed as follows, $$\theta = \Omega T\left[1 - \cos\left(-\Omega T + \frac{\phi_1 + \phi_2}{2}\right)\right] + \Omega T\left[1 - \cos\left(-\Omega T + \frac{\phi_1 - \phi_2}{2}\right)\right] \quad (19)$$

where either the half phase sum or the half phase difference is set to zero. Both of these forms fit the data. In other representations, solutions match data when $$-\Omega T + \frac{\phi_1 + \phi_2}{2} = \frac{\pi}{2}$$

and the phase difference term is a function of $$-\Omega T + \frac{\phi_1 - \phi_2}{2} \quad \text{or} \quad -\Omega T + \frac{\phi_1 - \phi_2}{2} = \frac{\pi}{2}$$

and the phase sum term is a function of $$-\Omega T + \frac{\phi_1 + \phi_2}{2}.$$

These solutions represent correlation and uncertainty relations and conjugate-like behavior.

Summary of Photon Correlation Periodicities

The measurement periodicity for interactive and noninteractive phase sum and phase difference settings in a $-2\pi$ to plus $2\pi$ coordinate system is summarized in the following tables. The interactive two photon Glauber coherences $g^{(2)}$ and the coincidences had a period of $2\pi$. The interactive phase modulated $g^{(2)}$ and coincidence fluctuation correlations exhibited a period of $\pi$. The phase sum modulation of the noninteractive $g^{(2)}$ and coincidences exhibited $2\pi$ periodicities. The fluctuation correlations exhibited a period of $\pi$. The noninteractive $g^{(2)}$ and coincidence fluctuation correlations had a period of $4\pi$. The single photon fluctuation correlations had a period of $4\pi$.

1. Interactive
   a. The $g^{(2)}$ and coincidence $2\pi$ see FIG. 2.
   b. Fluctuation correlations $\pi$ see FIG. 5.
2. Noninteractive
   a. $g^{(2)}$ and coincidences $2\pi$ see Table6.
   b. Noninteractive $g^{(2)}$ fluctuation correlations $4\pi$ see FIG. 8.
   c. Noninteractive singles correlations $4\pi$ see FIG. 11.
   d. Noninteractive singles correlations angle $4\pi$ see FIG. 10.

Developing a new entangled photon capability, the invention demonstrates noninteractive modulation control of (a) $g^{(2)}$ and coincidences, (b) $g^{(2)}$ and coincidence fluctuation correlations, and (c) single photon correlations in a double MZI small quantum network. The invention quantum mechanically modeled and verified the interaction free modulation of the polarization entangled pairs of photons (biphotons) and their single photons. Interaction free modulation means that measured photons never directly interact with modulated (noninteractive) optical elements. Usually, entangled photons are interactively modulated by photons passing through the modulating polarization analyzers. Additionally, novel interactively modulated coincidence fluctuation correlations provided higher frequency oscillations than modulated mean coincidences. The interaction free modulation was successfully modeled as a function of the entangled photon properties, noninteracting phase settings, entanglement, and the time-frequency bandwidth, a measure of uncertainty and resolution. This invention makes significant contributions towards progress in quantum network communications, quantum sensing/imaging and distributed quantum information processing. Further benefits of this invention include potential leveraging of loss free control of nonlocal entanglement, new engineering modalities, nanotechnology, and noninteractive entanglement distribution.

Figure 12:
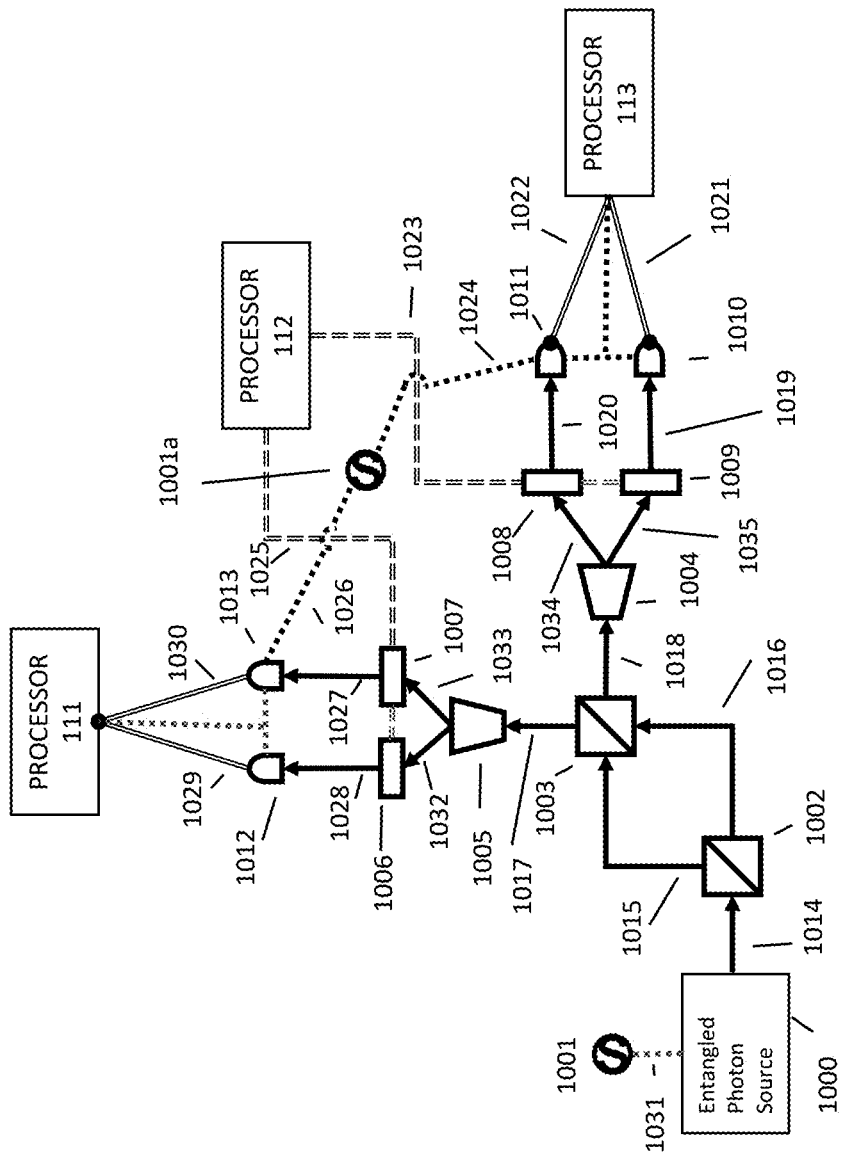
FIG. 12 is a schematic block diagram illustration of a preferred embodiment entangled photon communications system to transfer information from a sender to a receiver using at least one pair of entangled photons and at least one polarization analyzer pair to encode the information to be transmitted and a second pair of polarization analyzers to determine the correlations of the measured interaction-free modulated entangled photon pairs. Photons measured by the receiver are photons that did not directly interact with the sender polarization analyzers(s).

As shown in FIG. 12, when the single photons (S) at the signal (s) and idler (i) wavelengths ($S_s$ and $S_i$) exit, for example component 1003 to be measured by detector 1012 and detector 1013 or measured by detector 1010 and detector 1011 that the correlations have maxima at +/−360 values for the difference of the SPA settings and a minima near 0 for the value of the difference of the SPA settings. In this configuration, to send a bit value of "1" using the triplet process the sender would set the SPA to values wherein the difference is +/−360 for the High measurement where +360 is a value of positive 360 and −360 is a value of negative 360 for the difference of the $\text{SPA}_a$ and $\text{SPA}_b$ values; the receiver would make the measurements to determine the correlation and store that value; the sender would then set the SPA settings such that the difference is 0 for the Low measurement and the receiver would make measurements to determine the correlation and store that value; for the last High measurement, the sender would set the SPA to values wherein the difference is +/−360 and the receiver would perform measurements to determine the correlation and store that value. The receiver would see that they measured a High-Low-High correlation sequence and determine that the sender sent a bit value of "1". Similarly, a bit value of "0" would be determined by a receiver measured Low-High-Low correlation sequence.

In a configuration where the receiver measurements of the single photons are made by, for example, detectors 1012 and 1011 experiments show that the correlation of the fluctuation of the singles have minima at +/−360 for the SPA settings difference and a maxima at 0 for the SPA settings difference. In this configuration, to send a bit value of 1 using the triplet process the sender would set the SPA to values wherein the difference is 0 for the High measurement; the receiver would make the measurements to determine the correlation and store that value; the sender would then set the SPA values such that the difference is +/−360 and the receiver would make the measurements to determine the correlation and store that value; for the last High measurement, the sender would set the SPA to values wherein the difference is 0 and the receiver would perform measurements to determine the correlation and store that value. The receiver would see that they measured a High-Low-High correlation sequence and determine that the sender sent a bit value of "1". Similarly, a bit value of "0" would be determined by a receiver measured Low-High-Low correlation sequence. It is to be appreciated that other detector combinations may be used such as detectors 1012, 1010; 1013, 1011; and 1013, 1010 for the $I_a$ and $I_b$ measurement.

DETAILED DESCRIPTION OF THE DRAWINGS

FIG. 1 is a conceptual diagram illustration of the invention using pulsed polarization entangled photons injected into two balanced Mach Zehnder interferometers. Measurements and phase control are on the exterior of the interferometers.

FIG. 2 presents measurements using the invention of Coincidences vs Interactive Phase Sum Settings.

FIG. 3 presents measurements using the invention of Coincidences vs. Non-Interactive Phase Difference Settings.

FIG. 4 presents measurements using the invention of $g^{(2)}$ Fluctuation Correlation Angle vs. Interactive Phase Difference Settings.

FIG. 5 presents measurements using the invention of $g^{(2)}$ Fluctuation Correlation vs. Interactive Phase Difference Settings.

FIG. 6 presents measurements using the invention of $g^{(2)}$ vs. noninteractive half phase sum settings.

FIG. 7 presents measurements using the invention of $g^{(2)}$ vs. noninteractive half phase sum settings.

FIG. 8 presents results of the inventive system computing correlations of the receiver measured $g'^{(2)}$ as a function of the difference of the sender polarization analyzer settings illustrating the basis for the non-interaction information transmission system. The symbols are the measured correlations and the solid line is a predictive model fit to the measured results FIG. 9 presents measurements using the invention of $g^{(2)}$ Fluctuation Correlation Angle vs. Noninteracting Phase Difference Settings.

FIG. 10 presents results of the inventive system computing correlation angles of the receiver measured $\langle I_a'I_b' \rangle$ as a function of the difference of the sender polarization analyzer settings illustrating the basis for the non-interaction information transmission system. The symbols are the measured correlations and the solid lines are predictive model fits to the measured results.

FIG. 11 presents results of the inventive system computing correlations of the receiver $\langle I_a'I_b' \rangle$ in as a function of the difference of the sender polarization analyzer settings illustrating the basis for the non-interaction information transmission system. The symbols are the measured correlations and the solid lines are predictive model fits to the measured results.

FIG. 12 is a preferred embodiment of the present invention that utilizes entangled photons and their properties as carriers of information that is encoded in the relationship between the pairs of entangled photons. Component 1000 generates entangled photon pairs. Component 1000 may be associated with a clock 1001. Clock 1001 may be operatively associated with the pulse repetition rate of component 1000 or optionally synchronized with other timing sources such as atomic clocks or GPS signals. The clock signal is provided to component 1000 along path 1031.

Entangled photon pairs are directed along path 1014 to an input of path splitter 1002. Path splitter 1002 directs input photons from 1014 to paths 1015 and 1016 with 50% probability. Component 1002 may be, but is not limited to, a 2×2 fiber coupler or a 50/50 beam splitter. Paths 1015 and 1016 direct photons to first and second inputs of component 1003. Component 1003 directs the input photons from 1015 and 1016 to paths 1017 and 1018 with probability 50%. Component 1003 may be, but is not limited to, a 2×2 fiber coupler or a 50/50 beam splitter. Photons directed along path 1018 are directed to path splitter 1004, path splitter 1004 may be, but is not limited to, a wavelength division multiplexer.

After path splitter 1004, photons directed along path 1034 interact with polarization analyzer 1008. Polarization analyzer 1008 operates to change the phase of an input photon by a specified amount. The amount of phase change is provided by processor 112 along path 1023. After component 1008 photons are directed to photon detector 1011 along path 1020. The combination of components 1008 and 1011 may be considered as a polarization sensitive detector. Photon detector 1011 may be optionally gated by a timing signal provided by clock 1001a along path 1024. Clock 1001a may be operatively associated with the pulse repetition rate of component 1000 or other timing sources such as atomic clocks or GPS signals. Element 1011 photon detection events are directed to processor 113 along path 1022.

Photons directed along path 1035 interact with polarization analyzer 1009. Polarization analyzer 1009 operates to change the phase of an input photon by a specified amount. The amount of phase change is provided by processor 112 along path 1023. After component 1009 photons are directed to photon detector 1010 along path 1019. The combination of components 1009 and 1010 may be considered as a polarization sensitive detector. Photon detector 1010 may be optionally gated by a timing signal provided by clock 1001a along path 1024.

Element 1010 photon detection events are directed to processor 113 along path 1021. Processor 113 operates to record single photon detection events provided by photon detectors 1010 and 1011 and generate and record coincident (CC) detection events at the specified polarization analyzer settings using timing information provided by clock 1001a along path 1024. Processor 113 may optionally compute $g^{(2)}$ values; variations of the CC, $g^{(2)}$, or products of the fluctuations of single photon measurements contain the information transmitted by the sender. In particular a sequence of $g^{(2)}$, CC, or correlations of products of fluctuations may be used to encode information. Photons directed along path 1017 are directed to path splitter 1005, path splitter 1005 may be, but is not limited to, a wavelength division multiplexer.

After path splitter 1005, photons directed along path 1032 interact with polarization analyzer 1006. Polarization analyzer 1006 operates to change the phase of an input photon by a specified amount. The amount of phase change is provided by processor 112 along path 1025. After component 1006 photons are directed to photon detector 1012 along path 1028. The combination of components 1006 and 1012 may be considered as a polarization sensitive detector. Photon detector 1012 may be optionally gated by a timing signal provided by clock 1001a along path 1026. Element 1012 photon detection events are directed to processor 111 along path 1029. Photons directed along path 1033 interact with polarization analyzer 1007.

Polarization analyzer 1007 operates to change the phase of an input photon by a specified amount. The amount of phase change is provided by processor 112 along path 1025. After component 1007 photons are directed to photon detector 1013 along path 1027. The combination of components 1007 and 1013 may be considered a polarization sensitive detector. Photon detector 1013 may be optionally gated by a timing signal provided by clock 1001a along path 1026. Element 1013 photon detection events are directed to processor 111 along path 1030. Processor 111 operates to record single photon detection events provided by photon detectors 1012 and 1013, and generate and record coincident (CC) detection events at the specified polarization analyzer settings using timing information provided by clock 1001a along path 1026.

Processor 111 may optionally compute $g^{(2)}$ values; variations of the CC, $g^{(2)}$, or products of the fluctuations of single photon measurements contain the information transmitted by the sender. In particular a sequence of $g^{(2)}$, CC, or correlations of products of fluctuations may be used to encode information. It is to be noted that components 1002, 1003, 1015, and 1016 comprise the geometry of a Mach-Zehnder interferometer. Where there are at least two channels within the MZI it will be appreciated this may be considered as a dual, double, or multiple MZI.

Polarization analyzers 1006, 1007, 1008 and 1009 consist of half-wave plates and quarter-wave plates and a polarizer and can be configured by processor 112 to make measurements in any polarization basis and to correct for any systematic polarization distortions occurring along the respective paths.

Figure 13:
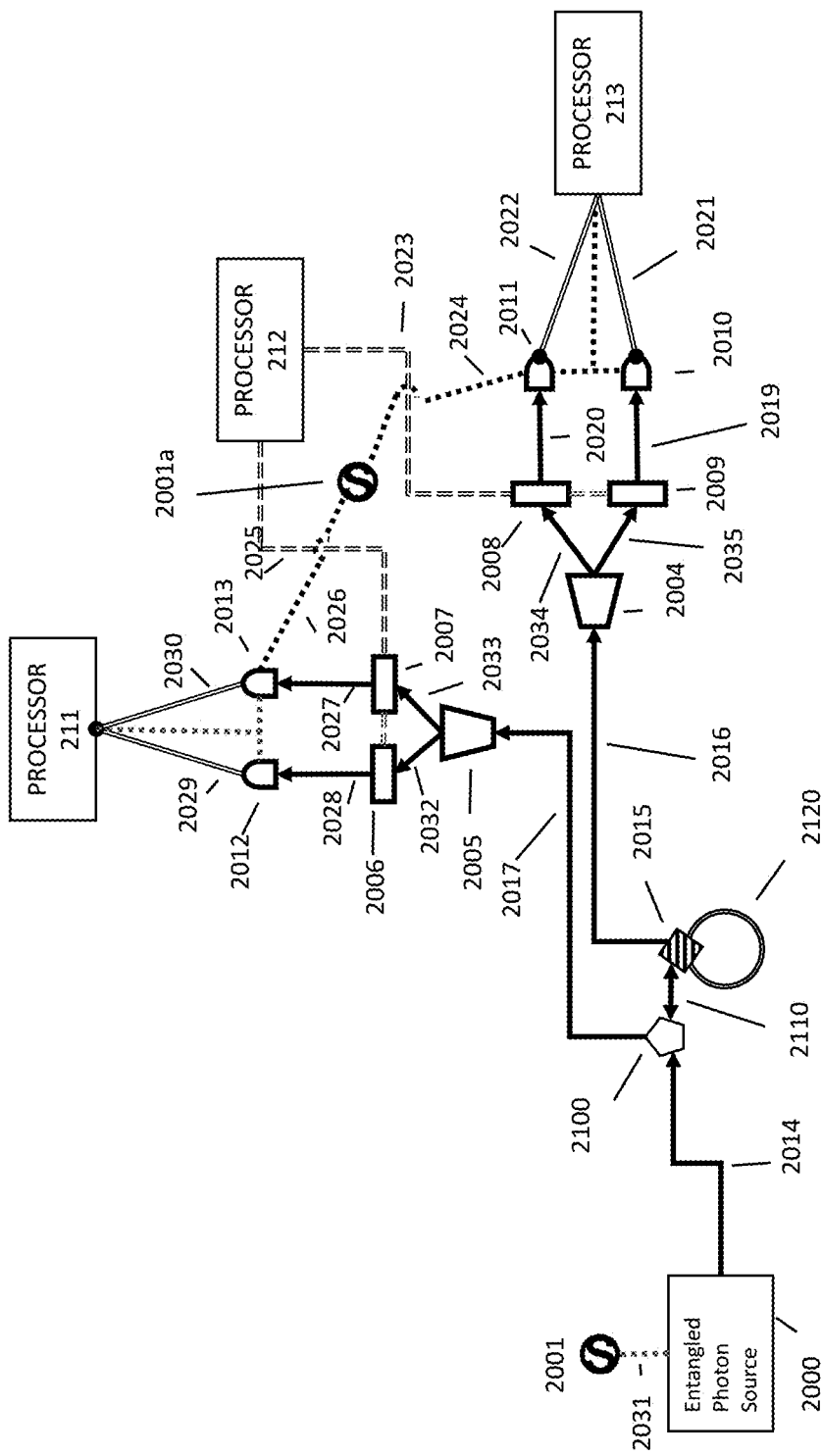
FIG. 13 is a schematic block diagram illustration of a preferred embodiment entangled photon communications system to transfer information from a sender to a receiver using at least one pair of entangled photons and at least one polarization analyzer pair to encode the information to be transmitted and a second pair of polarization analyzers to determine the correlations of the measured interaction-free modulated entangled photon pairs. Photons measured by the receiver are photons that did not directly interact with the sender polarization analyzer(s).

FIG. 13 is a preferred embodiment of the present invention that utilizes entangled photons and their properties as carriers of information that is encoded in the relationship between the pairs of entangled photons. A preferred embodiment of the current invention is shown in FIG. 13. Component 2000 generates entangled photon pairs. Component 2000 may be associated with a clock 2001. Clock 2001 may be operatively associated with the pulse repetition rate of component 2000 or optionally synchronized with other timing sources such as atomic clocks or GPS signals. The clock signal is provided to component 2000 along path 2031. Entangled photon pairs are directed along path 2014 to an input of circulator 2100. Circulator 2100 operates to transfer photons from an input path to output at the next path in a counter-clockwise direction, e.g., photons input on path 2014 are transferred to path 2110 and photons input from path 2110 are transferred to path 2017. Photons transferred to path 2110 are directed to interact with path splitter/combiner 2015.

Path splitter/combiners 2015 may be, but is not limited to, a 2×2 fiber coupler or a 50/50 beam-splitter. Path splitter/combiner 2015 directs the input photons onto path 2120 in clockwise and counter-clockwise directions with 50% probability. After propagation over path 2120 the clockwise and counter-clockwise propagating photons interact with component 2015 and are directed towards component 2100 over path 2110 or to component 2004 over path 2016. Photons directed along path 2016 are directed to path splitter 2004, path splitter 2004 may be, but is not limited to, a wavelength division multiplexer. After path splitter 2004, photons directed along path 2034 interact with polarization analyzer 2008. Polarization analyzer 2008 operates to change the phase of an input photon by a specified amount. The amount of phase change is provided by processor 212 along path 2023.

After polarization analyzer 2008 photons are directed to photon detector 2011 along path 2020. The combination of components 2008 and 2011 may be considered a polarization sensitive detector. Photon detector 2011 may be optionally gated by a timing signal provided by clock 2001a along path 2024. Clock 2001a may be operatively associated with the pulse repetition rate of component 2000 or other timing sources such as atomic clocks or GPS signals. Element 2011 photon detection events are directed to processor 213 along path 2022. Photon directed along path 2035 interact with polarization analyzer 2009. Polarization analyzer 2009 operates to change the phase of an input photon by a specified amount. The amount of phase change is provided by processor 212 along path 2023. After component 2009 photons are directed to photon detector 2010 along path 2019. The combination of components 2009 and 2010 may be considered a polarization sensitive detector.

Photon detector 2010 may be optionally gated by a timing signal provided by clock 2001a along path 2024. Element 2010 photon detection events are directed to processor 213 along path 2021. Processor 213 operates to record single photon detection events provided by photon detectors 2010 and 2011; generate and record coincident (CC) detection events at the specified polarization analyzer settings using timing information provided by clock 2001a along path 2024. Processor 213 may optionally compute $g^{(2)}$ values; variations of the CC, $g^{(2)}$, or products of the fluctuations of single photon measurements contain the information transmitted by the sender. In particular, a sequence of $g^{(2)}$, CC, or correlations of products of fluctuations may be used to encode information.

Photons directed along path 2017 are directed to path splitter 2005, path splitter 2005 may be, but is not limited to, a wavelength division multiplexer. After path splitter 2005, photons directed along path 2032 interact with phase polarization analyzer 2006. Polarization analyzer 2006 operates to change the phase of an input photon by a specified amount. The amount of phase change is provided by processor 212 along path 2025. After component 2006 photons are directed to photon detector 2012 along path 2028. The combination of components 2006 and 2012 may be considered a polarization sensitive detector. Photon detector 2012 may be optionally gated by a timing signal provided by clock 2001a along path 2026. Element 2012 photon detection events are directed to processor 211 along path 2029. Photons directed along path 2033 interact with polarization analyzer 2007. Polarization analyzer 2007 operates to change the phase of an input photon by a specified amount. The amount of phase change is provided by processor 212 along path 2025.

After component 2007 photons are directed to photon detector 2013 along path 2027. The combination of components 2007 and 2013 may be considered a polarization sensitive detector. Photon detector 2013 may be optionally gated by a timing signal provided by clock 2001a along path 2026. Element 2013 photon detection events are directed to processor 211 along path 2030. Processor 211 operates to record single photon detection events provided by photon detectors 2012 and 2013; generate and record coincident (CC) detection events at the specified polarization analyzer settings using timing information provided by clock 2001a along path 2026.

Processor 211 may optionally compute $g^{(2)}$ values; variations of the CC, $g^{(2)}$, or products of the fluctuations of single photon measurements contain the information transmitted by the sender. In particular a sequence of $g^{(2)}$, CC, or correlations of products of fluctuations may be used to encode information. It is to be noted that components 2110, 2015, and 2120 comprise the geometry of a Sagnac interferometer. Where there at least two channels within the Sagnac interferometer it will be appreciated this may be considered as a dual, double, or multiple Sagnac interferometer. Polarization analyzers 2006, 2007, 2008 and 2009 consist of half-wave plates and quarter-wave plates and a polarizer and can be configured by processor 212 to make measurements in any polarization basis and to correct for any systematic polarization distortions occurring along the respective paths.

Figure 14:
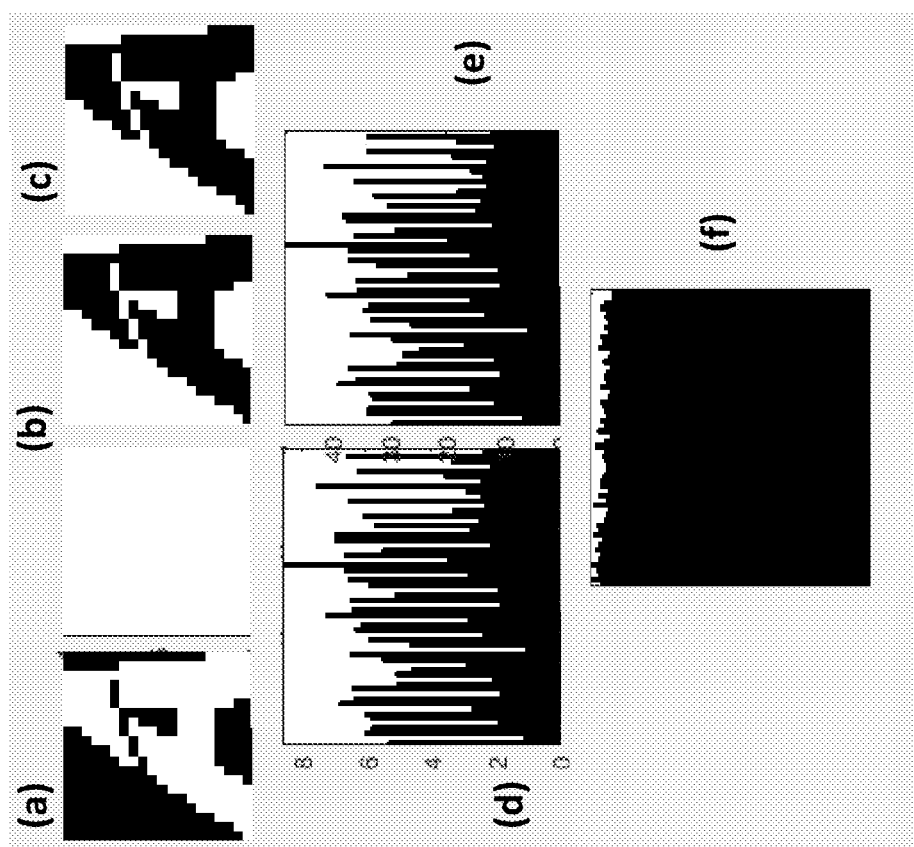
FIG. 14 presents results of the invention transmitting an image of an "A" using non-interactively modulated transmission of information.

FIG. 14 presents results of the invention transmitting an image of an "A" using the non-interactive and transmission of information. The sender encoded information by modulating non interactive elements 1008 and 1009 which modulate the path entanglement. The receiver measured photons that interacted with components 1006 and 1007 wherein the components were set to parallel orientations (a) is the "A" image information to be transmitted to the right is a blank space, (b) is the measured received image using $g^{(2)}$ values, (c) is the measured received image using coincidence counts, (d) presents the g(2) values measured by the receiver, (e) presents the coincidence counts measured by the receiver, and (f) presents the single photon counts measured by the receiver.

Figure 15:
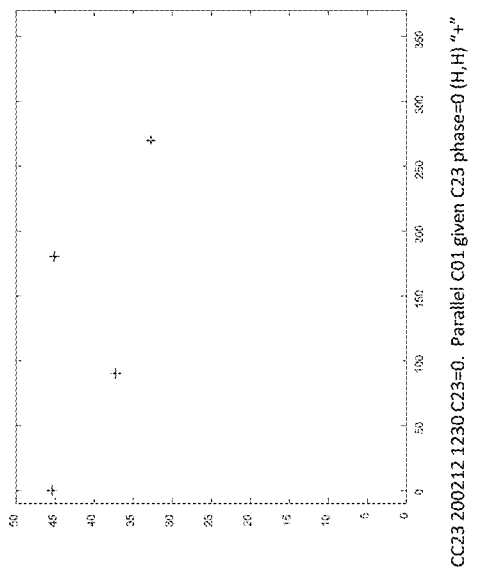
FIG. 15 shows results from experiments using the current invention illustrating the modulation of the measured coincidence values from changing the phase settings of the components in non-interacting photons' paths.

FIG. 15 shows results from experiments using the current invention illustrating the modulation of the measured coincidence values from changing the phase settings of the components in non-interacting photons' paths.

Figure 16:
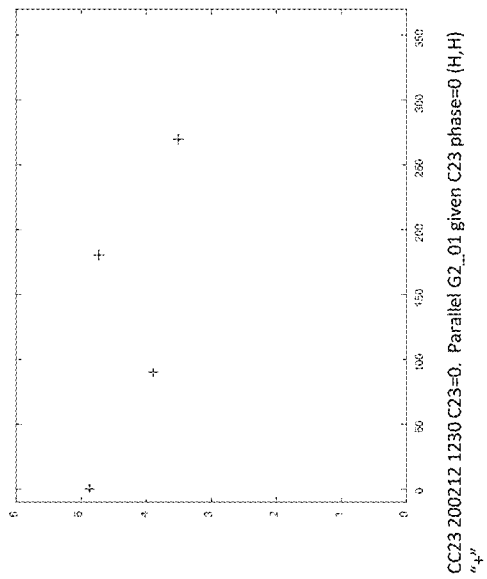
FIG. 16 shows results from experiments using the current invention illustrating the modulation of the measured $g^{(2)}$ values from changing the phase settings of the components in the non-interacting photons' paths.

FIG. 16 shows results from experiments using the current invention illustrating the modulation of the measured $g^{(2)}$ values from changing the phase settings of the components in non-interacting photons' paths.

Figure 17:
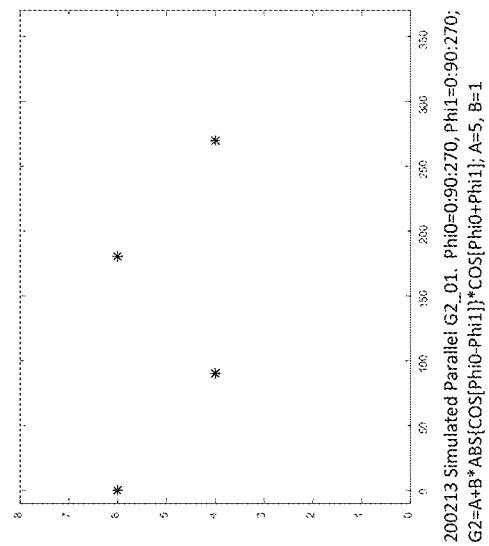
FIG. 17 shows simulated results illustrating the modulation of measured coincidence or $g^{(2)}$ based on modulating components in the paths of the photons that do not interact with the receiver detectors.

FIG. 17 shows simulated results illustrating the modulation of measured coincidence or $g^{(2)}$ based on modulating components in the paths of the photons that do not interact with the receiver detectors.

Figure 18:
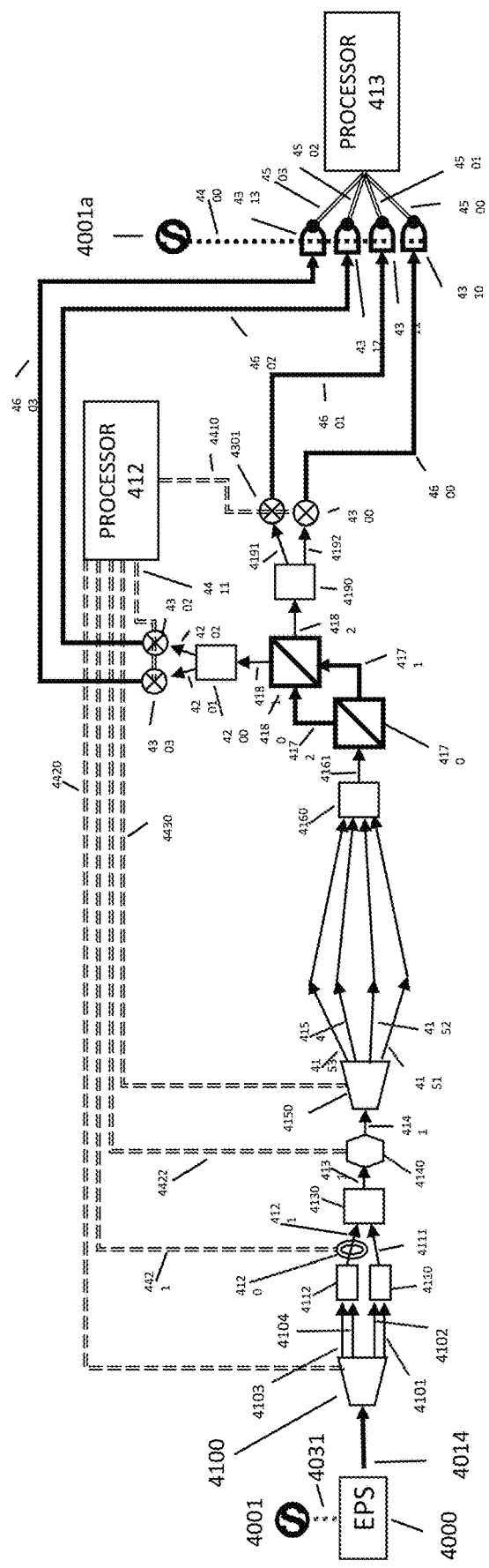
FIG. 18 is a schematic block diagram illustration of a preferred embodiment entangled photon communications system to transfer information from a sender to a receiver using at least one pair of entangled photons and at least one polarization analyzer to encode the information to be transmitted. Photons measured by the receiver are photons that did not directly interact with the sender polarization analyzer(s).

FIG. 18 is a preferred embodiment of the present invention that utilizes entangled photons and their properties as carriers of information that is encoded in the relationship between the pairs of entangled photons. A preferred embodiment of the current invention is shown in FIG. 18. Component 4000 generates entangled photon pairs. Component 4000 may be associated with a clock 4001. Clock 4001 may be operatively associated with the pulse repetition rate of component 4000 or optionally synchronized with other timing sources such as atomic clocks or GPS signals. The clock signal is provided to component 4000 along path 4031. Entangled photon pairs are directed along path 4014 to an input of a component 4100. Component 4100 is a high resolution wavelength selective component which may include but is not limited to devices like the Finisar WaveShaper®, or ultra-dense wavelength division multiplexers that operate to direct specified wavelengths to specified outputs. Optionally processor 412 provides specified wavelength selections to component 4100 along path 4420. Component 4100 directs selected signal wavelengths to paths 4101 and 4102 and directs selected idler wavelengths to paths 4103 and 4104.

Paths 4101 and 4102 are directed to path combiner 4110. Path combiner 4110 may be but is not limited to a wavelength division multiplexers or a 2×1 fiber coupler. Paths 4103 and 4104 are directed to path combiner 4112, path combiner 4112 may be but is not limited to wavelength division multiplexers or 2×1 fiber couplers. After path combiner 4110 entangled photons are directed to path combiner 4130 over path 4111. After path combiner 4112 entangled photos are directed to polarization phase modulator 4120. Component 4120 operates to change the polarization phase relationship between signal and idler entangled photon pairs. The value of the polarization phase relationship is provided to component 4120 by processor 412 over path 4421.

After component 4210 the entangled photons are directed to path combiner 4130 over path 4121. Component 4130 operates to combine input signal and idler wavelengths into a single output path. Path combiner 4130 may include but is not limited to wavelength division multiplexers or 2×1 fiber couplers. After path combiner 4130 photons are directed to phase modulator 4140 along path 4131. Component 4140 operates on input photon wavelengths to generate +/− sideband wavelengths centered on the input wavelengths. The amount of phase modulation to generate side bands is provided by 412 over path 4422. Output from component 4140 is directed to component 4150 over path 4141. Component 4150 is a high resolution wavelength selective component which may include but is not limited to devices like the Finisar WaveShaper®, or ultra-dense wavelength division multiplexers that operates to direct specified wavelengths to specified outputs. Component 4150 directs selected signal wavelengths to paths 4151 and 4152 and directs selected idler wavelengths to paths 4153 and 4154. Optionally processor 412 provides the wavelength selection to component 4150 along path 4430.

After 4150 paths 4151, 4151, 4153 and 4254 are directed to path combiner 4160. Component 4160 operates to combine input signal and idler wavelengths into a single output path. Path combiner 4160 may include but is not limited to wavelength division multiplexers or 4×1 fiber couplers. After component 4160 photons are directed to component 4170 over path 4161. Component 4170 operates to direct photons into a transmission and reflection paths with 50% probability for each path. Component 4170 may include but is not limited to a 50/50 beam splitter or a 2×2 fiber coupler. After component 4170 the transmission and reflection paths are directed to separate inputs of component 4180 over paths 4171 and 4172. Component 4180 operates to mix the reflected and transmitted photons input from paths 4171 and 4172 to output paths 4181 and 4182 with 50% probability. Component 4180 may include but is not limited to a 50/50 beam splitter or 2×2 fiber coupler.

Photons from component 4180 are directed to path splitters 4190 and 4200 over paths 4181 and 4182. Component 4190 operates to direct input photons into signal and idler paths. Component 4190 may be but is not limited to wavelength division multiplexers. After component 4190 photons are directed towards phase polarization analyzers 4300 and 4301 over paths 4191 and 4192. Polarization analyzer 4300 operates to change the phase of an input photon by a specified amount. The amount of phase change is provided by processor 412 along path 4410. After component 4300 photons are directed to photon detector 4310 along path 4600. The combination of components 4300 and 4310 may be considered a polarization sensitive detector. Photon detector 4310 may be optionally gated by a timing signal provided by clock 4001$a$ along path 4400. Element 4310 photon detection events are directed to processor 413 along path 4500. Clock 4001$a$ may be operatively associated with the pulse repetition rate of component 4000 or other timing sources such as atomic clocks or GPS signals.

Polarization analyzer 4301 operates to change the phase of an input photon by a specified amount. The amount of phase change is provided by processor 412 along path 4410. After component 4301 photons are directed to photon detector 4311 along path 4601. The combination of components 4301 and 4311 may be considered a polarization sensitive detector. Photon detector 4311 may be optionally gated by a timing signal provided by clock 4001$a$ along path 4400. Element 4311 photon detection events are directed to processor 413 along path 4501. Component 4200 operates to direct input photons into signal and idler paths. Component 4200 may be but is not limited to wavelength division multiplexers.

After component 4200 photons are directed towards polarization analyzers 4302 and 4303 over paths 4201 and 4202. Polarization analyzer 4302 operates to change the phase of an input photon by a specified amount. The amount of phase change is provided by processor 412 along path 4411. After component 4302 photons are directed to photon detector 4312 along path 4602. The combination of components 4302 and 4312 may be considered a polarization sensitive detector. Photon detector 4312 may be optionally gated by a timing signal provided by clock 4001$a$ along path 4400. Element 4312 photon detection events are directed to processor 413 along path 4502. Polarization analyzer 4303 operates to change the phase of an input photon by a specified amount. The amount of phase change is provided by processor 412 along path 4411. After component 4303 photons are directed to photon detector 4313 along path 4603. The combination of components 4303 and 4313 may be considered a polarization sensitive detector. Photon detector 4313 may be optionally gated by a timing signal provided by clock 4001a along path 4400. Element 4313 photon detection events are directed to processor 413 along path 4503. The processor 413 operates to compute $g^{(2)}$ values from the recorded single photon and coincident photon events at the specified polarization analyzer settings. From the CC or $g^{(2)}$ wavefunction amplitudes and phases may be determined. Additionally, the $g^{(2)}$ or CC may be used to determine information transmitted; variations of the CC, $g^{(2)}$, or products of the fluctuations of single photon measurements contain the information transmitted by the sender. In particular a sequence of $g^{(2)}$, CC, or correlations of products of fluctuations may be used to encode information. Furthermore, processor 413 operates to record single photon counts and determine and record coincident detection events between the selected signal and idler sidebands.

Note that components 412 and 413 may be replicated for any pair of detectors to provide a distinct sender and receiver, e.g., a sender 412 may control components 4302 and 4303, a receiver 413 controls components 4300 and 4301 and determines the information transferred by the sender from measurements on detectors 4310 and 4311 wherein the information is encoded by the sender through the settings applied to components 4303 and 4302.

Polarization analyzers 4300, 4301, 4302 and 4303 consist of half-wave plates and quarter-wave plates and a polarizer and can be configured by processor 412 to make measurements in any polarization basis and to correct for any systematic polarization distortions occurring along the respective paths.

Figure 19:
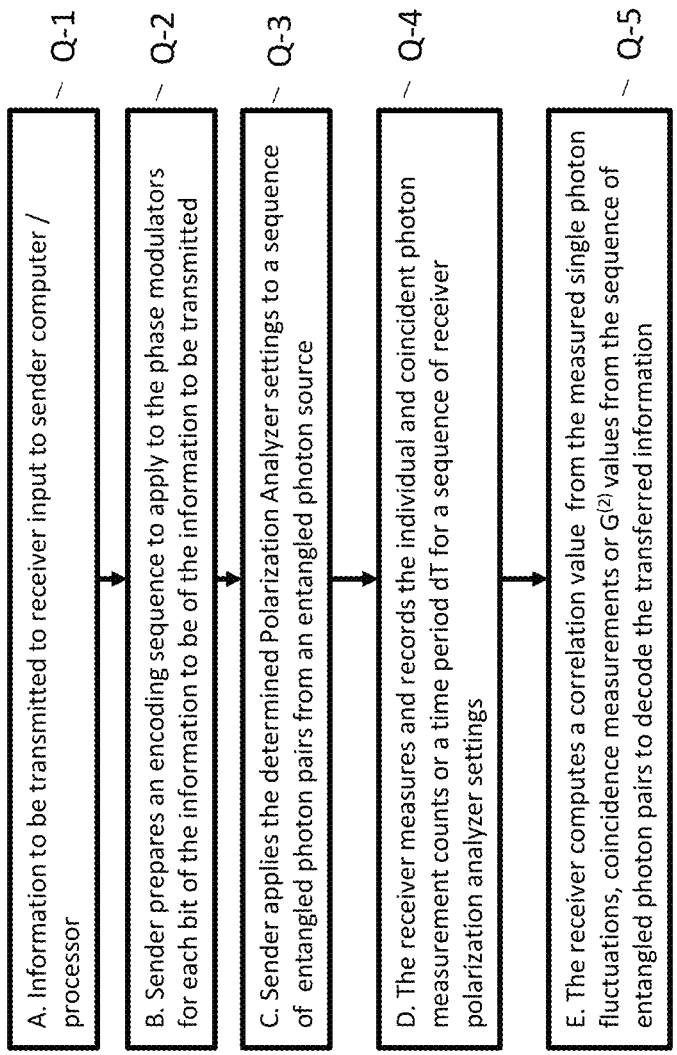
FIG. 19 is a schematic block diagram illustration of the process steps of a preferred embodiment non-interaction information transmission system.

FIG. 19 is a methodology for transmission of encoded information from a sender to a receiver employing the properties of quantum entanglement. The methodology comprises the following steps performed by the sender and receiver. In step Q-1 the information to be transmitted to the receiver is input to the sender. In step Q-2 the sender prepares a sequence of modulation settings representative of the information to be transmitted. In step Q-3 the sender encodes a sequence of polarization analyzer settings in accordance with the prepared encoding that interact with entangled photons of a sequence of entangled photon pairs from an entangled photon source. In step Q-4 the receiver measures and records the number of individual detection events and the number of coincident detection events within some time period dT for a specified number of receiver polarization analyzer settings. In step Q-5 the receiver computes a correlation value from the measured single photon count fluctuations, coincidence measurements or $g^{(2)}$ values from the sequence of entangled photon pairs to decode the transferred information.

Figure 20:
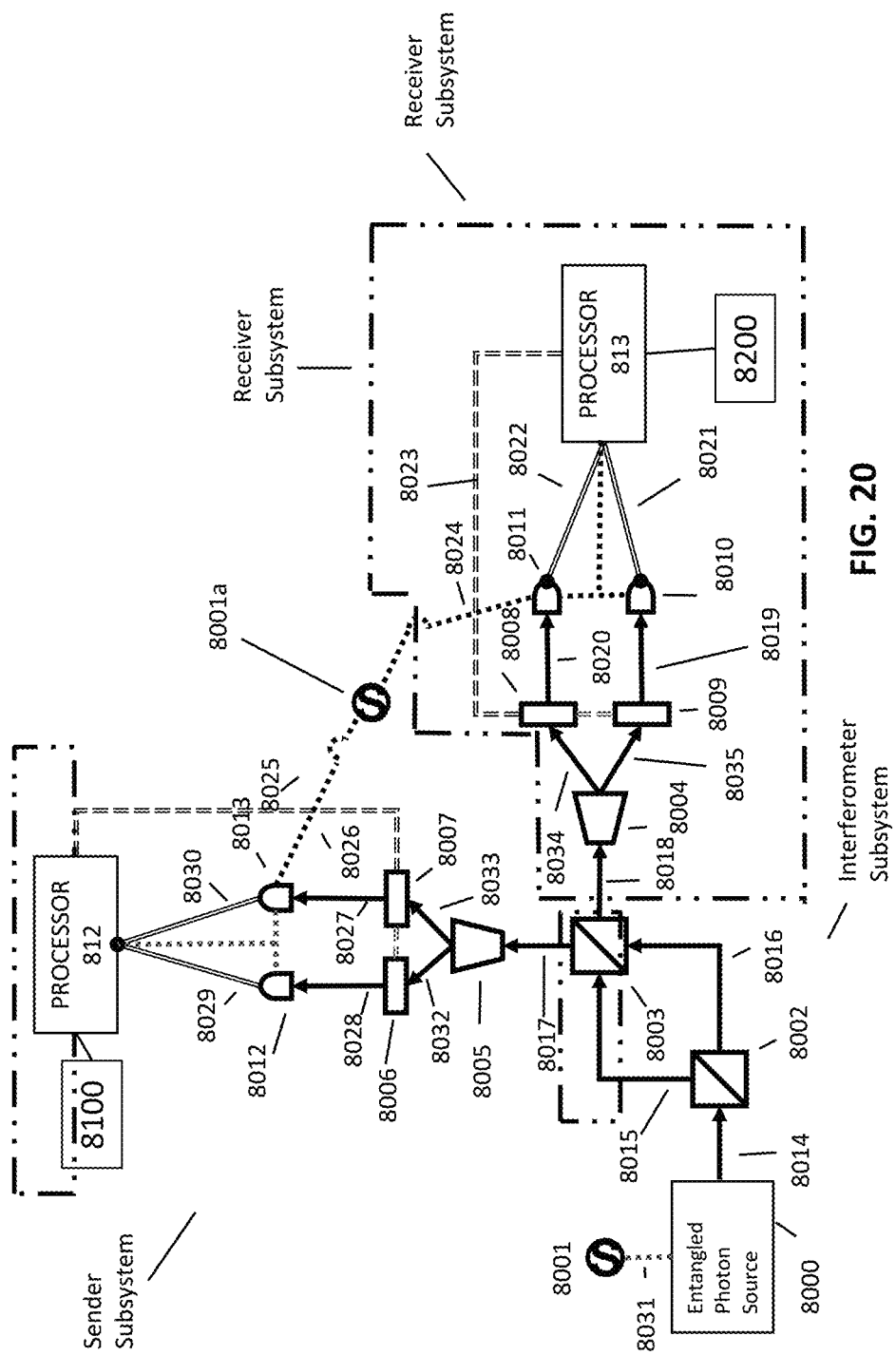
FIG. 20 is a schematic block diagram illustration of an exemplary preferred embodiment entangled photon communications system to transfer information from a sender to a receiver using at least one pair of entangled photons and at least one polarization analyzer pair to encode the information to be transmitted and a second pair of polarization analyzers to determine the correlations of the measured interaction-free modulated entangled photon pairs. Photons measured by the receiver are photons that did not directly interact with the sender polarization analyzer(s).

FIG. 20 is an exemplary preferred embodiment of the present invention that utilizes entangled photons and their properties as carriers of information that is encoded in the relationship between the pairs of entangled photons. Component 8000 generates entangled photon pairs. Component 8000 may be associated with a clock 8001. Clock 8001 may be operatively associated with the pulse repetition rate of component 8000 or optionally synchronized with other timing sources such as atomic clocks or GPS signals. The clock signal is provided to component 8000 along path 8031. Entangled photon pairs are directed along path 8014 to an input of path splitter 8002.

Path splitter 8002 directs input photons from path 8014 to paths 8015 and 8016 with 50% probability. Component 8002 may be, but is not limited to, a 2×2 fiber coupler or a 50/50 beam splitter. Paths 8015 and 8016 direct photons to first and second inputs of component 8003. Component 8003 directs the input photons from 8015 and 8016 to paths 8017 and 8018 with probability 50%. Component 8003 may be, but is not limited to, a 2×2 fiber coupler or a 50/50 beam splitter. Components 8003, 8002, 8015 and 8016 comprise an interferometer subsystem.

Photons directed to the receiver subsystem along path 8018 are directed to receiver path splitter 8004, path splitter 8004 may be, but is not limited to a wavelength division multiplexer. After component 8004, photons directed along path 8034 interact with polarization analyzer 8008. Polarization analyzer 8008 operates to change the phase of an input photon by a specified amount. The amount of phase change is provided by processor 813 along path 8023.

After component 8008 photons are directed to photon detector 8011 along path 8020. The combination of components 8008 and 8011 may be considered as a polarization sensitive detector. Photon detector 8011 may be optionally gated by a timing signal provided by clock 8001a along path 8024. Clock 8001a may be operatively associated with the pulse repetition rate of component 8000 or other timing sources such as atomic clocks or GPS signals. Element 8011 photon detection events are directed to processor 813 along path 8022. Photons directed along path 8035 interact with polarization analyzer 8009.

Polarization analyzer 8009 operates to change the phase of an input photon by a specified amount. The amount of phase change is provided by processor 813 along path 8023. After component 8009 photons are directed to photon detector 8010 along path 8019. The combination of components 8009 and 8010 may be considered as a polarization sensitive detector. Photon detector 8010 may be optionally gated by a timing signal provided by clock 8001a along path 8024. Element 8010 photon detection events are directed to processor 813 along path 8021.

Processor 813 operates to record single photon detection events provided by photon detectors 8010 and 8011; generate and record coincident (CC) detection events at the specified polarization analyzer settings using timing information provided by clock 8001a along path 8024. Processor 813 may optionally compute $g^{(2)}$ values; variations of the CC, $g^{(2)}$, or products of the fluctuations of single photon measurements contain the information transmitted by the sender. In particular a sequence of $g^{(2)}$, CC, or correlations of products of fluctuations may be used to encode information.

Photons directed to the sender subsystem along path 8017 are directed to path splitter 8005, the sender path splitter 8005 may be, but is not limited to a wavelength division multiplexer. After component 8005, photons directed along path 8032 interact with polarization analyzer 8006. Polarization analyzer 8006 operates to change the phase of an input photon by a specified amount. The amount of phase change is provided by processor 812 along path 8025. After component 8006 photons are directed to photon detector 8012 along path 8028. The combination of components 8006 and 8012 may be considered as a polarization sensitive detector. Photon detector 8012 may be optionally gated by a timing signal provided by clock 8001a along path 8026. Element 8012 photon detection events are directed to processor 812 along path 8029.

Photons directed along path 8033 interact with polarization analyzer 8007. Polarization analyzer 8007 operates to change the phase of an input photon by a specified amount. The amount of phase change is provided by processor 812 along path 8025. After component 8007 photons are directed to photon detector 8013 along path 8027. The combination of components 8007 and 8013 may be considered a polarization sensitive detector. Photon detector 8013 may be optionally gated by a timing signal provided by clock 8001a along path 8026. Element 8013 photon detection events are directed to processor 812 along path 8030.

Processor 812 operates to record single photon detection events provided by photon detectors 8012 and 8013; generate and record coincident (CC) detection events at the specified polarization analyzer settings using timing information provided by clock 8001a along path 8026. Processor 812 may optionally compute $g^{(2)}$ values; variations of the CC, $g^{(2)}$, or products of the fluctuations of single photon measurements contain the information transmitted by the sender. In particular a sequence of $g^{(2)}$, CC, or correlations of products of fluctuations may be used to encode information. It is to be noted that components 8002, 8003, 8015, and 8016 comprise the geometry of a Mach-Zehnder interferometer (MZI). Where there at least two channels within the MZI it will be appreciated this may be considered as a dual, double, or multiple MZI.

Sender subsystem component 8100 provides the information to be sent to the receiver to processor 812. Component 8100 allows for the input of the sender provided information and may include, but is not limited to, keyboards, video/audio players, e.g., compact disc players, digital video disc players, video cassette players etc., cameras, microphones and similar devices. Sender processor 812 generates a sequence of phase settings to encode the information to be sent to the receiver. The generated sequence of phase settings encoding the information are provided to components 8006 and 8007, the sender polarization analyzers, to send the encoded information to the receiver. The sender entangled photons being measured by detectors 8012 and 8013.

Receiver subsystem computer 813 generates and applies phase settings to components 8008 and 8009, the receiver polarization analyzers, consistent with determining the correlation of the photon detections measured by components 8010 and 8011. Computer 813 determines the changes of the correlations which indicate the information being sent. The sent information determined by processor 813 is provided to component 8200. Component 8200 displays and records the information provided by the sender. Component 8200 may be, but is not limited to, monitors, printers, digital storage devices, compact disc recorders, digital video recorders, video cassette recorders and other text/audio/video recorders.

Polarization analyzers 8006, 8007, 8008 and 8009 consist of half-wave plates and quarter-wave plates and a polarizer and can be configured by processor 812 or 813 to make measurements in any polarization basis and to correct for any systematic polarization distortions occurring along the respective paths.

It is to be recognized that both the sender subsystem and receiver subsystem may comprise modulations and measurements using multiple pairs of distinguishable channels, e.g., multiple pairs of polarization entangled photons for multiple signal/idler wavelength pairs (channels). For example, components 8005 and 8004 may direct at least two entangled photon signal/idler wavelengths to individual polarization sensitive detectors wherein the settings are applied individually to each polarization sensitive detector by the appropriate processor. The processor (e.g., components 812/813) for the sender/receiver subsystems would record the photon measurements and determine coincidence detections and compute any $g^{(2)}$, correlation, or other computation(s) required between each pair of signal/idler photons.

Figure 21:
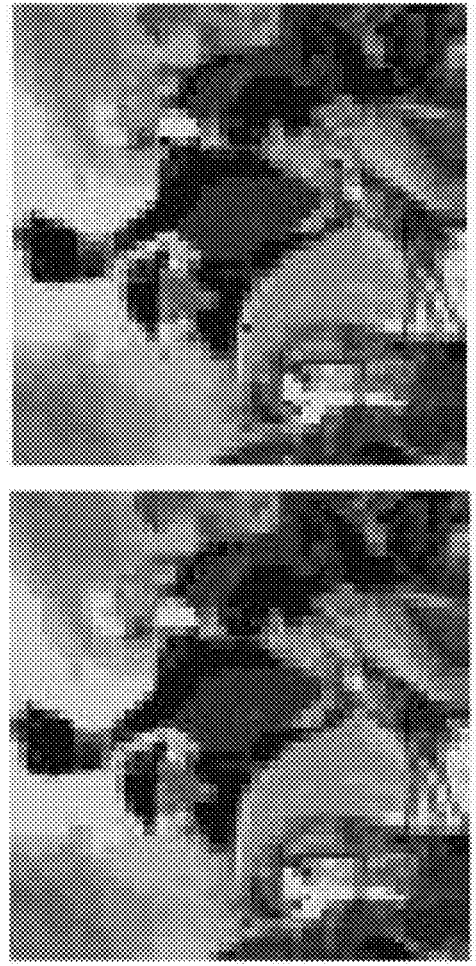
FIG. 21 shows an example image of a 16 bit color image of George Washington in the US Continental Army in a battle communicated using entangled photons and the encoding method used by the inventive system.

FIG. 21 shows an example image of a 16 bit color image of George Washington in the US Continental Army in a battle communicated using entangled photons and the encoding method used by the inventive system.

As used herein, the terminology "channel" means that the entangled photon pairs have at least one further measurable property such as wavelength where, for example, one photon of the entangled pair can be measured at wavelength A and the other photon of the entangled pair can be measured at wavelength B. An exemplary example of a device that can separate an input signal into distinct channels is a wavelength division multiplexer (WDM). A wave length division multiplexer operates on the principle of wavelength diffraction. In wavelength diffraction, when light of a specific wavelength interacts with the diffracting media it is reflected or transmitted at a specific angle. In a typical fiber optic WDM at least two wavelengths are input into the device which is built to transmit or "pass" one wavelength and reflect all other wavelengths. A WDM can also be used to combine at least two distinct wavelengths into a single fiber called "common" path with low loss. Similarly, if at least two wavelengths are input along the "common" path, the "pass" wavelength will be transmitted and all other wavelengths will be reflected into a "reflected" path. So, to combine two wavelengths the pass wavelength is input on the "pass" path and other wavelengths are input into the reflection path. The input on the "pass" path is transmitted into the "common" path and the input on the "reflection" path is reflected into the "common" path. To separate multiple wavelengths, multiple wavelengths may be input along the "common" path, the "pass" wavelength is transmitted into the "pass" path and all other wavelengths are reflected into the "reflect" path.

It should be recognized that commercially available WDMs operating in the telecom range have a set of defined pass wavelengths and are labeled at ITU channels. Each channel is 100 GHz wide in frequency units, about 0.8 nm wide in wavelength units, with a small bandwidth gap between each ITU channel to reduce wavelength "crosstalk". WDMs may operate as a filter for the "pass" path, i.e., only photons of the frequency or wavelength of the "pass" channel will propagate thru the pass path and all other frequencies and wavelengths will be reflected away from the "pass" path.

In the current invention, any photon possesses multiple degrees of freedom including but not limited to polarization, frequency, photon-number, phase, wavelength, orbital angular momentum, and linear momentum. Entanglement can exist between polarizations, e.g., horizontal and vertical, or between any of the degrees of freedom of a photon or multiple photons. The properties the other degrees of freedom can be used to separate photons into distinct paths, i.e., channels, without disturbing the entanglement that exists on other degrees of freedom. In the specific instance of the current invention, the entanglement relationship being modulated is polarization entanglement and the wavelength degree of freedom is used to separate photons onto distinct paths. It is to be appreciated that multiple path splitters may be used in the current invention to access more entanglement properties and increase efficiency.

Measurement of a photon by a detector typically entails the absorption of the photon by a photo-sensitive material.

The photo-sensitive material would then typically produce an excess charge or change in current that would be recorded as a detection of a photon. It should be further be appreciated that communication of data from a sender to a receiver in the presence of noise can be better represented by correlation measurements between two detectors than measurement by either of the detectors separately. Single photon measurements may be subject to a variety of noise from sources such as quantum noise, stray light scattering, and detector noise. Joint detection or coincidence measurements which include correlation measurements and Bell state measurements, etc., largely reduce the effects of this type of noise that would otherwise degrade the data, signal or message that would be communicated.

While it is not generally appreciated in this area, corrections can also be made to the coincidence measurements by first determining the background level of coincidence detections and compensating for this background by incorporating the single photon measurements as described in R. Meyers, et al., U.S. patent application Ser. Nos. 14/303,078, 14/461,625, 16/829,272, and ARL 20-14 herein incorporated by reference. Interpretations of measurements between at least two detectors such as in coincidence measurements can be improved by monitoring the single photon measurement counts and scaling by incorporating the single photon counts. For example, for photon number resolving detectors, the subtraction of the product of a relevant time average of the single photon counts from the relevant time average of the product of the single photon counts may improve the fidelity of the information received by the receiver that was sent by the sender. Also, periods of high coincidence measurements with low single photon counts may indicate periods where there is low background noise and where signals can be received with higher fidelity.

As used herein the terminology "correlated" means that the correlation value is non-zero, i.e., positive or negative, and uncorrelated means that the correlation value is zero.

Entangled Photon Sources

Exemplary examples of entangled photon sources include entangled photons generated via Spontaneous Parametric Down-conversion (SPDC) in a nonlinear crystal such a Beta-Barium Borate (BBO) or Potassium Titanyl Phosphate (KTP), entangled photons generated in a quasi-phase matched nonlinear media such as periodically poled KTP (PPKTP) or periodically poled Lithium Niobate (PPLN), and entangled photons generated in a four-wave mixing (FWM) process in a nonlinear optical fiber or polarization maintaining birefringent optical fiber.

Entangled photons generated with SPDC or FWM processes typically generate entangled photon pairs centered near two wavelengths, $\lambda_s$ and $\lambda_i$, these wavelengths are traditionally called signal and idler wavelengths. The signal wavelength is of a higher energy/shorter wavelength and the idler wavelength is of a lower energy/longer wavelength. The pump photons for the nonlinear process of entangled photon generation maybe be provided by, but are not limited to, pulsed or continuous laser sources.

Photons possess a number of degrees of freedom including but not limited to polarization, frequency, photon-number, phase, wavelength, orbital angular momentum, and linear momentum. Entanglement can exist between polarizations, e.g., horizontal and vertical, frequencies, or between any of the degrees of freedom of a photon or multiple photons. A stimulated FWM process may be employed to generate correlated photons whereas the more typical FWM methods rely upon a spontaneous process for the generation of photon pairs. Note that entanglement refers to the superposition of at least two components of a composite quantum state, such as the polarization of two photons, where the state of the system cannot be factored as a direct product of the components.

Measurement of the entangled photon pairs is an interference between conjugate degrees of freedom of a quantum particle pair (photon pair) and may exhibit constructive interference yielding maxima of coincident detections or destructive interference yielding minima of coincidence detections.

Entangled photons also have the property of temporal entanglement which means that the entangled pairs are entangled over a time interval between detector measurements that comprise a coincident detection. Furthermore, entangled photons have the property of spatial entanglement which means that entangled pairs are entangled over a length of spatial displacement between detector measurements, and entangled photons may have space and time entanglement wherein there is both a spatial length and temporal interval between detector measurements.

It is to be appreciated that many quantum particles and quantum particle systems have properties that are analogous or equivalent to optical polarization (D. Ross, "*I Don't Understand Quantum Mechanics*," https://www.southampton.ac.uk/~doug/quantum_physics/index.html 2018). For example, an electron spin is equivalent to optical polarization and that the electron spin may be modulated via the use of applied magnetic fields and the spin state of the electron may be determined using a Stern-Gerlach device (polarization analyzer). For all quantum states there exists a means to modulate or change the orientation of that state, similarly, there exists a way to measure that quantum state. As an example, photons may have the quantum state of polarization, which can be modulated or altered using wave-plates or similar components, the polarization state may then be propagated through a polarizing component such as a polarizer or polarizing beam splitter, to be measured by a photon detector. Similarly, the effects of optical half wave and quarter wave plates can be treated in electron spin states by applying a magnetic field an appropriately polarized electromagnetic pulse. There also exist electron spin interferometers (see Y. K. Kato, et al., "*Electron spin interferometry using a semiconductor ring structure*," Applied Physics Letters 86, 162107 (2005)) that are analogous to photon interferometers. As a further example, electron path splitters may be realized with transcribable probabilities using electronic potentials or charged filaments to direct single electrons down particular paths, i.e., path splitting.

The foregoing description is illustrative of particular embodiments of the invention but is not meant to be a limitation upon the practice thereof. Many variations and modifications may be made to the above-described embodiments. All such modifications and variations are intended to be included herein within the scope of the disclosure and protected by the following claims. The invention has been described in detail with particular reference to certain preferred embodiments thereof, but it will be understood that variations and modifications can be affected within the spirit and scope of the invention.

What is claimed is:

1. A system for communicating information using entangled particles comprising:
   a sender subsystem;
   a receiver subsystem;
   a shared sequence of polarization analyzer settings for the sender subsystem and
   the receiver subsystem;

at least one pulsed entangled particle source configured to output entangled particle pairs; the entangled particle pairs comprising a first and second particles; the first and second particles being inputted to an interferometer subsystem; the interferometer subsystem comprising at least one input and at least two outputs; the interferometer subsystem operating to direct the first and second particles to the first and second outputs of the interferometer subsystem; the first output of the interferometer subsystem being connected to the sender subsystem, the second output of the interferometer subsystem being connected to the receiver subsystem;

the sender subsystem comprising:
at least two sender polarization analyzers;
at least two sender detectors;
at least one path splitter; the at least one path splitter configured to direct the first particles to the first sender polarization analyzer and the second particles to the second sender polarization analyzer;
at least one processor configured to receive inputted particle, encode information, and apply signals to the first and second sender polarization analyzers to determine the relative state of the inputted particles; and the receiver subsystem comprising:
at least two receiver polarization analyzers;
at least two receiver detectors;
at least one path splitter;
the receiver subsystem being configured to direct particles non-interactively modulated by the sender to the path splitter;
the at least one path splitter configured to direct the first particles to the first receiver polarization analyzer and direct the second particles to the second receiver polarization analyzer;
the first and second receiver polarization analyzers being configured to transmit particles of a specified polarization to the first and second receiver detectors respectively;
at least one processor configured to record both coincident and individual particles detection events by the detectors, decode the transmitted information and output the decoded information;

whereby information is transmitted from the sender to the receiver through the interaction free modulation of the entangled particle state.

2. The system of claim 1 wherein the entangled particle source provides a sequence of polarization entangled particle pairs across a plurality of distinguishable measurable channels, modulating the polarization of one of the sequence of particles of the polarization entangled particle pairs in each distinguishable channel, the receiver being configured to receive a plurality of distinguishable measurable channels, each distinguishable measurable channel being directed to a polarization analyzer associated with that channel, each channel of the receiver having a distinct detector, and the processor being configured to record single events and coincident events between specified pairs of detectors.

3. The system of claim 1 wherein the entangled particles comprise entangled photons.

4. The system of claim 3 wherein the entangled photons are provided by a four-wave mixing process.

5. The system of claim 3 wherein the entangled photons are provided by a spontaneous parametric down-conversion process.

6. The system of claim 3 wherein the entangled photons are generated by a continuous source.

7. The system of claim 1 wherein the encoding of information to be transmitted is translated to a binary representation, the transmission of each binary bit value of "1" is translated to a binary representation, the transmission of each binary bit value of "1" entails setting the polarization analyzers to produce a maxima of coincidences measured by the receiver and a bit value of "0" entails setting the polarization analyzers to produce a minima of coincidences measured by the receiver, and the polarizers of the receiver being set to parallel polarizations.

8. The system of claim 7 wherein the transmission of a bit value "1" entails setting the sender polarization analyzers to produce a sequence of high-low-high correlations of the product of the fluctuations of the receiver measured single particle counts, and a bit value of "0" entails setting the sender polarization analyzers to produce a sequence of low-high-low correlations of the products of the fluctuations of the receiver measured single particle counts; a measured high-low-high correlation sequence being interpreted by the receiver as a "1" and a measured low-high-low correlation sequence being interpreted by the receiver as a "0"; the correlations being determined by $$\text{Corr}_S = \frac{\langle I'_a I'_b \rangle_{a,b}}{(\sigma_a)(\sigma_b)}$$

where $I_a' = I_a - \langle I_a \rangle_{a,b}$ where $\langle \ \rangle_{a,b}$ indicates an average over the Receiver Polarization Analyzer (RPA) a and Receiver Polarization Analyzer (RPA) b settings and $I_a' = I_b - \langle I_b \rangle_{a,b}$ where $\langle \ \rangle_{a,b}$ indicates an average over the $\text{RPA}_a$ and $\text{RPA}_b$ settings;

$$\sigma_a = \sqrt{\langle (I'_a)^2 \rangle_{a,b}}$$

where $\langle \ \rangle_{a,b}$ indicates an average over the a and b settings and $$\sigma_b = \sqrt{\langle (I'_b)^2 \rangle_{a,b}}$$

where $\langle \ \rangle_{a,b}$ indicates an average over the a and b settings; the correlation being computed for a specified pair of Sender Polarization Analyzer (SPA) a and Sender Polarization Analyzer (SPA) b settings; the a and b indicate the first and second polarization analyzers and detectors respectively.

9. The system of claim 7 wherein the transmission of a bit value "1" entails setting the sender polarization analyzers to produce a sequence of low-high-low correlations of the product of the fluctuations of the receiver measured single particle counts, and a bit value of "0" entails setting the sender polarization analyzers to produce a sequence of high-low-high correlations of the product of the fluctuations of the receiver measured single particle counts; a high-low-high correlation sequence being interpreted as a "1" and a low-high-low correlation sequence being interpreted by the receiver at a "0"; the correlations being determined by $$\text{Corr}_S = \frac{\langle I'_a I'_b \rangle_{a,b}}{(\sigma_a)(\sigma_b)}$$

where $I_a'=I_a-\langle I_a\rangle_{a,b}$ where $\langle\ \rangle_{a,b}$ indicates an average over the Receiver Polarization Analyzer (RPA) a and Receiver Polarization Analyzer (RPA) b settings and $I_b'=I_b-\langle I_b\rangle_{a,b}$ where $\langle\ \rangle_{a,b}$ indicates an average over the RPA$_a$ and RPA$_b$ settings;

$$\sigma_a = \sqrt{\langle (I_a')^2\rangle_{a,b}}$$

where $\langle\ \rangle_{a,b}$ indicates an average over the a and b settings and $$\sigma_b = \sqrt{\langle (I_b')^2\rangle_{a,b}}$$

where $\langle\ \rangle_{a,b}$ indicates an average over the a and b settings; the correlation being computed for a specified pair of Sender Polarization Analyzer (SPA) a and Sender Polarization Analyzer (SPA) b settings; the a and b indicate the first and second polarization analyzers and detectors respectively.

10. The system of claim 7 wherein the transmission of a bit value "1" entails setting the sender polarization analyzers to produce a sequence of high-low-high correlations of the deviations of coincidences or $g^{(2)}$ by the receiver, and a bit value of "0" entails setting the sender polarization analyzers to produce a sequence of low-high-low correlations of the deviations of the coincidences or $g^{(2)}$ measured by the receiver; a high-low-high sequence of correlations of coincidences or $g^{(2)}$ being interpreted as a "1" and a low-high-low sequence of correlations being interpreted by the receiver at a "0"; the correlations being determined by $$\mathrm{Corr} = \frac{\langle C_{ab'} C_{a'b}\rangle_{a,b}}{(\sigma_{ab'})(\sigma_{a'b})}$$

where $C_{ab}'=C_{ab}-\langle C_{ab}\rangle_b$ where $\langle\ \rangle_b$ indicates an average over the Receiver Polarization Analyzer (RPA) b settings and $C_{a'b}=C_{ab}-\langle C_{ab}\rangle_a$ where $\langle\ \rangle_a$ indicates an average over the Receiver Polarization Analyzer (RPA) a settings;

$$\sigma_{ab'} = \sqrt{\langle (C_{ab'})^2\rangle_{b'}}$$

where $\langle\ \rangle_{b'}$ indicates an average over the Receiver Polarization Analyzer (RPA) b' settings and $$\sigma_{a'b} = \sqrt{\langle (C_{a'b})^2\rangle_{a'}}$$

where $\langle\ \rangle_{a'}$ indicates an average over the Receiver Polarization Analyzer (RPA) a' settings; the correlation being computed at a specified pair of Sender Polarization Analyzer (SPA) a and Sender Polarization Analyzer (SPA) b settings; the a and b indicate the first and second polarization analyzers and detectors respectively.

11. The system of claim 7 wherein the information to be transmitted is encoded in entangled particle modulation and $g^{(2)}$ magnitude modulation via a non-interactive phase manipulation.

12. The system of claim 7 wherein the transmission of a bit "1" entails setting the polarization analyzers to produce a sequence of high-low-high coincidences or $g^{(2)}$ by the receiver, and a bit value of "0" entails setting the polarization analyzers to produce a sequence of low-high-low coincidences measured by the receiver; a high-low-high sequence of coincidence or $g^{(2)}$ being interpreted as a "1" and a low-high-low sequence being interpreted by the receiver as a "0".

13. The system of claim 12 wherein the information being transmitted is text.

14. The system of claim 12 wherein the information being transmitted is a color image.

15. A method of information transfer from a sender unit to a receiver unit using entangled particles, wherein the sender unit and the receiver unit are each located at different physical locations, wherein at least one entangled particle source provides a plurality of distinguishable channels of polarization entangled particle pairs, and each channel of polarization entangled particle pairs is modulated individually, and the receiver unit provides a plurality of measurement devices operating to measure an entangled particle state between each distinguishable channel comprising:
   providing a sender unit comprising an input for inputting data, at least two polarization analyzers, and at least one processor configured to convert the inputted data into a plurality of sequential information photons having information associated therewith;
   providing a shared sequence of polarization analyzer settings for the sender unit and the receiver unit;
   providing the at least one pulsed entangled particle source configured to output entangled particle pairs; the entangled particle pairs comprising a first particle and a second particle;
   providing a receiver unit comprising an input operating to receive the entangled particle pairs, the measurement device operating to measure the state of the entangled particle pairs, and at least two detectors;
   measuring the entangled particle state of the entangled particle pairs using the at least two detectors to thereby transfer the information; the information being transferred from the sender unit to the receiver unit through the transfer of the interaction-free entangled particle states modulated by the sender due to the entanglement of the first and the second particles.

16. The method of claim 15 wherein the information to be transmitted is encoded in correlations of coincident particles or single particles measured by the receiver.

17. The method of claim 16 wherein the information to be transmitted is encoded in entangled particle modulation and $g^{(2)}$ magnitude modulation via a non-interactive phase manipulation.

18. The method of claim 17 wherein the information to be transmitted is text information.

19. The method of claim 17 wherein the information to be transmitted is image information.

20. The method of claim 16 wherein the entangled particles comprise entangled photons.

21. The method of claim 20 wherein the entangled photons are generated by a four-wave mixing process.

22. The method of claim 20 wherein the entangled photons are generated by a spontaneous parametric down-conversion process.

23. The method of claim 20 wherein the entangled photons are generated by a continuous source.

* * * * *